(12) United States Patent
Imafuji et al.

(10) Patent No.: US 8,792,783 B2
(45) Date of Patent: *Jul. 29, 2014

(54) EXCHANGEABLE LENS

(71) Applicant: Nikon Corporation, Tokyo (JP)

(72) Inventors: Kazuharu Imafuji, Kawasaki (JP);
Masafumi Oikawa, Mitaka (JP)

(73) Assignee: Nikon Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/622,699

(22) Filed: Sep. 19, 2012

(65) Prior Publication Data

US 2013/0071102 A1    Mar. 21, 2013

Related U.S. Application Data

(60) Provisional application No. 61/564,498, filed on Nov. 29, 2011.

(30) Foreign Application Priority Data

Aug. 31, 2011 (JP) ................................ 2012-191002
Sep. 20, 2011 (JP) ................................ 2011-205062

(51) Int. Cl.
*G03B 17/00* (2006.01)

(52) U.S. Cl.
USPC ........................................................ 396/532

(58) Field of Classification Search
USPC ........... 396/529, 531–532; 359/827, 828, 830
See application file for complete search history.

(56) References Cited

U.S. PATENT DOCUMENTS

| | | | |
|---|---|---|---|
| 5,065,175 A * | 11/1991 | Suzuki et al. | .................... 396/81 |
| 5,089,834 A * | 2/1992 | Nakasa et al. | ................. 396/176 |
| 6,336,754 B1 | 1/2002 | Sato et al. | |
| 6,341,902 B1 | 1/2002 | Sato et al. | |

(Continued)

FOREIGN PATENT DOCUMENTS

| | | |
|---|---|---|
| JP | A-07-234432 | 9/1995 |
| JP | A-9-211656 | 8/1997 |

(Continued)

OTHER PUBLICATIONS

U.S. Appl. No. 13/622,787 in the name of Imafuji et al. filed Sep. 19, 2012.

(Continued)

*Primary Examiner* — W B Perkey
*Assistant Examiner* — Minh Phan
(74) *Attorney, Agent, or Firm* — Oliff PLC

(57) ABSTRACT

An exchangeable lens includes: a camera lens mount unit having a mount center point, to which a camera body, with twelve body connector terminals disposed near a camera body mount unit at the camera body, is attached; a holding portion where twelve lens connector terminals, each connected to one of the twelve body connector terminals and each including a contact area to come into contact with one of the body connector terminals, are disposed; an optical system that includes a drive target member which can be driven; and a drive unit that drives the drive target member. A distance setting apart a center of at least one lens connector terminal among the twelve lens connector terminals from the mount center point is different from a distance setting apart a center of at least one other lens connector terminal from the mount center point.

19 Claims, 16 Drawing Sheets

(56) References Cited

U.S. PATENT DOCUMENTS

| | | | |
|---|---|---|---|
| 8,400,722 | B2 | 3/2013 | Imafuji et al. |
| 2009/0269049 | A1 | 10/2009 | Ueda et al. |
| 2010/0091175 | A1 | 4/2010 | Shintani et al. |
| 2011/0317062 | A1 | 12/2011 | Fujino et al. |
| 2012/0063020 | A1 | 3/2012 | Imafuji et al. |
| 2012/0195587 | A1 | 8/2012 | Hasuda et al. |
| 2013/0077954 | A1 | 3/2013 | Oikawa et al. |
| 2013/0077955 | A1 | 3/2013 | Imafuji et al. |
| 2013/0077956 | A1 | 3/2013 | Imafuji et al. |
| 2013/0077957 | A1 | 3/2013 | Oikawa et al. |

FOREIGN PATENT DOCUMENTS

| | | |
|---|---|---|
| JP | A-2008-233773 | 10/2008 |
| JP | A-2010-288307 | 12/2010 |
| JP | A-2012-155290 | 8/2012 |

OTHER PUBLICATIONS

U.S. Appl. No. 13/622,784 in the name of Oikawa et al. filed Sep. 19, 2012.
U.S. Appl. No. 13/622,711 in the name of Imafuji et al. filed Sep. 19, 2012.
U.S. Appl. No. 13/622,828 in the name of Oikawa et al. filed Sep. 19, 2012.
May 3, 2013 Notice of Allowance issued in U.S. Appl. No. 13/622,787.
May 31, 2013 Supplemental Notice of Allowance issued in U.S. Appl. No. 13/622,787.
Jun. 7, 2013 Office Action issued in U.S. Appl. No. 13/622,784.
Apr. 30, 2013 Notice of Allowance issued in U.S. Appl. No. 13/622,711.
May 23, 2013 Corrected Notice of Allowability issued in U.S. Appl. No. 13/622,711.
May 10, 2013 Office Action issued in U.S. Appl. No. 13/622,828.
Japanese Office Action issued in Japanese Application No. 2012-191002 dated Dec. 4, 2012 (w/translation).
Japanese Office Action issued in Japanese Application No. 2012-191003 dated Dec. 4, 2012 (w/translation).
Japanese Office Action issued in Japanese Application No. 2012-191004 dated Dec. 4, 2012 (w/translation).
Japanese Office Action issued in Japanese Application No. 2012-191005 dated Dec. 4, 2012 (w/translation).
Japanese Office Action issued in Japanese Application No. 2012-191006 dated Dec. 4, 2012 (w/translation).
Japanese Office Action issued in Japanese Application No. 2012-191007 dated Dec. 4, 2012 (w/translation).

* cited by examiner

EXCHANGEABLE LENS

This non-provisional application claims the benefit of U.S. Provisional Application No. 61/564,498 filed Nov. 29, 2011. This application also claims priority from Japanese Application No. 2011-205062 filed Sep. 20, 2011 and Japanese Application No. 2012-191002 filed Aug. 31, 2012. The disclosure of each of the earlier applications is incorporated herein by reference in its entirety.

BACKGROUND OF THE INVENTION

1. Field of the Invention

The present invention relates to an exchangeable lens.

2. Description of Related Art

The camera body in a camera system known in the related art may engage in electrical communication with an exchangeable lens. Japanese Laid Open Patent Publication No. H7-234432 discloses an exchangeable lens that includes a group of terminals enabling the exchangeable lens to communicate with the camera body and an adapter (e.g., an intermediate ring or a rear focus converter). The terminals in this terminal group are disposed next to one another so as to form a circular arc pattern, and another group of terminals through which power is provided from the camera body to the exchangeable lens and the adapter, is disposed next to one end of the terminal group.

SUMMARY OF THE INVENTION

There is an issue yet to be addressed with regard to the exchangeable lens disclosed in the publication in that a lens-side terminal cannot achieve contact with a camera body-side terminal unless its position achieves the exact correspondence to the position of the camera body-side terminal.

An exchangeable lens according to a 1st aspect of the present invention, comprises: a camera lens mount unit having a mount center point, to which a camera body, with twelve body connector terminals disposed near a camera body mount unit at the camera body, is attached; a holding portion where twelve lens connector terminals, each connected to one of the twelve body connector terminals and each including a contact area to come into contact with one of the body connector terminals, are disposed; an optical system that includes a drive target member which can be driven; and a drive unit that drives the drive target member, wherein: the twelve lens connector terminals are: a first lens connector terminal through which a drive voltage to be used to engage the drive unit in operation is provided from the camera body; a second lens connector terminal that functions as a ground terminal corresponding to the drive voltage; a third lens connector terminal through which a first clock signal from the camera body is input; a fourth lens connector terminal through which a first data signal from the camera body is input in synchronization with the first clock signal; a fifth lens connector terminal through which a second data signal is output to the camera body in synchronization with the first clock signal; a sixth lens connector terminal through which a second clock signal from the camera body is input; a seventh lens connector terminal through which a third data signal is output to the camera body in synchronization with the second clock signal; an eighth lens connector terminal through which a first asynchronous signal that is not synchronous with the first clock signal or the second clock signal is output to the camera body; a ninth lens connector terminal through which a second asynchronous signal that is not synchronous with the first clock signal or the second clock signal is input from the camera body; a tenth lens connector terminal through which a third asynchronous signal that is not synchronous with the first clock signal or the second clock signal is output to the camera body; an eleventh lens connector terminal through which an operating voltage, enabling reception of the first data signal from the camera body through the fourth lens connector terminal and transmission of the second data signal to the camera body through the fifth lens connector terminal based upon the first asynchronous signal output through the eighth lens connector terminal and the first clock signal input through the third lens connector terminal and also enabling transmission of the third data signal to the camera body through the seventh lens connector terminal based upon the second asynchronous signal input through the ninth lens connector terminal, the third asynchronous signal output through the tenth lens connector terminal and the second clock signal input through the sixth lens connector terminal, is provided from the camera body; and a twelfth lens connector terminal that functions as a ground terminal corresponding to the operating voltage; an interior angle formed by the contact area of the first lens connector terminal and the contact area of the eleventh lens connector terminal at the mount center point is largest among interior angles, each formed by contact areas of any two lens connector terminals among the twelve lens connector terminals at the mount center point; an interior angle formed by the contact area of the eleventh lens connector terminal and the contact area of the twelfth lens connector terminal at the mount center point is smaller than an interior angle formed by the contact area of any lens connector terminal among the first lens connector terminal through the tenth lens connector terminal and the contact area of the eleventh lens connector terminal at the mount center point; an interior angle formed by the contact area of the third lens connector terminal and the contact area of the eleventh lens connector terminal at the mount center point is smaller than an interior angle formed by the contact area of any lens connector terminal among the first lens connector terminal, the second lens connector terminal and the fourth lens connector terminal through the tenth lens connector terminal and the contact area of the eleventh lens connector terminal at the mount center point; an interior angle formed by the contact area of the fourth lens connector terminal and the contact area of the eleventh lens connector terminal at the mount center point is smaller than an interior angle formed by the contact area of any lens connector terminal among the first lens connector terminal, the second lens connector terminal and the fifth lens connector terminal through the tenth lens connector terminal and the contact area of the eleventh lens connector terminal at the mount center point; an interior angle formed by the contact area of the fifth lens connector terminal and the contact area of the eleventh lens connector terminal at the mount center point is smaller than an interior angle formed by the contact area of any lens connector terminal among the first lens connector terminal, the second lens connector terminal and the sixth lens connector terminal through the tenth lens connector terminal and the contact area of the eleventh lens connector terminal at the mount center point; an interior angle formed by the contact area of the eighth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal, the ninth lens connector terminal and the tenth lens connector terminal and the contact area of the eleventh lens connector terminal at the mount center point; an interior angle formed by the contact area of the ninth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal and the tenth lens connector terminal and the contact area of the eleventh lens connector terminal at the mount center point; an interior angle formed by the contact area of the tenth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal and the seventh lens connector terminal and the contact area of the eleventh lens connector terminal at the mount center point; an interior angle formed by the contact area of the sixth lens connector terminal and the contact area of the eleventh lens connector terminal at the mount center point is smaller than an interior angle formed by the contact area of any lens connector terminal among the first lens connector terminal, the second lens connector terminal and the seventh lens connector terminal and the contact area of the eleventh lens connector terminal at the mount center point; an interior angle formed by the contact area of the seventh lens connector terminal and the contact area of the eleventh lens connector terminal at the mount center point is smaller than an interior angle formed by the contact area of either the first lens connector terminal or the second lens connector terminal and the contact area of the eleventh lens connector terminal at the mount center point; an interior angle formed by the contact area of the second lens connector terminal and the contact area of the eleventh lens connector terminal at the mount center point is smaller than an interior angle formed by the contact area of the first lens connector terminal and the contact area of the eleventh lens connector terminal at the mount center point; and a distance setting apart a center of at least one lens connector terminal among the twelve lens connector terminals from the mount center point is different from a distance setting apart a center of at least one other lens connector terminal from the mount center point.

According to a 2nd aspect of the present invention, in the exchangeable lens according to the 1st aspect, the twelve lens connector terminals may be disposed in the holding portion in a staggered pattern so as to achieve varying distances between centers of the lens connector terminals and the mount center point.

According to a 3rd aspect of the present invention, in the exchangeable lens according to the 1st aspect, it is preferable that a distance setting apart the center of at least one lens connector terminal among the first lens connector terminal, the second lens connector terminal, the eleventh lens connector terminal and the twelfth lens connector terminal from the mount center point is different from a distance setting apart the center of at least one lens connector terminal among the third lens connector terminal through the tenth lens connector terminal from the mount center point.

According to a 4th aspect of the present invention, in the exchangeable lens according to the 1st aspect, it is preferable that a distance setting apart the center of at least one lens connector terminal among the third lens connector terminal, the fourth lens connector terminal, the fifth lens connector terminal and the eighth lens connector terminal from the mount center point is different from a distance setting apart the center of at least one lens connector terminal among the sixth lens connector terminal, the seventh lens connector terminal, the ninth lens connector terminal and the tenth lens connector terminal from the mount center point.

According to a 5th aspect of the present invention, in the exchangeable lens according to the 1st aspect, it is preferable that a distance setting apart the center of at least one lens connector terminal among the third lens connector terminal, the fourth lens connector terminal, the sixth lens connector terminal and the ninth lens connector terminal from the mount center point is different from a distance setting apart the center of at least one lens connector terminal among the fifth lens connector terminal, the seventh lens connector terminal, the eighth lens connector terminal and the tenth lens connector terminal from the mount center point.

According to a 6th aspect of the present invention, in the exchangeable lens according to the 1st aspect, it is preferable that a distance setting apart the center of at least one lens connector terminal among the third lens connector terminal, the fourth lens connector terminal, the fifth lens connector terminal, the sixth lens connector terminal and the seventh lens connector terminal from the mount center point is different from a distance setting apart the center of at least one lens connector terminal among the eighth lens connector terminal, the ninth lens connector terminal and the tenth lens connector terminal from the mount center point.

According to a 7th aspect of the present invention, in the exchangeable lens according to any one of the 1st through 6th aspects, the contact area of at least one lens connector terminal among the twelve lens connector terminals may include a sloping part at which the lens connector terminal comes into contact with a body connector terminal.

An exchangeable lens according to an 8th aspect of the present invention comprises: a camera lens mount unit having a mount center point, to which a camera body, with twelve body connector terminals disposed near a camera body mount unit at the camera body, is attached; a holding portion where twelve lens connector terminals, each connected to one of the twelve body connector terminals and each including a contact area to come into contact with one of the body connector terminals, are disposed; an optical system that includes a drive target member which can be driven; and a drive unit that drives the drive target member, wherein: the twelve lens connector terminals are: a first lens connector terminal through which an drive voltage to be used to engage the drive unit in operation is provided from the camera body; a second lens connector terminal that functions as a ground terminal corresponding to the drive voltage; a third lens connector terminal through which a first clock signal from the camera body is input; a fourth lens connector terminal through which a first data signal from the camera body is input in synchronization with the first clock signal; a fifth lens connector terminal through which a second data signal is output to the camera body in synchronization with the first clock signal; a sixth lens connector terminal through which a second clock signal from the camera body is input; a seventh lens connector terminal through which a third data signal is output to the camera body in synchronization with the second clock signal; an eighth lens connector terminal through which a first asynchronous signal that is not synchronous with the first clock signal or the second clock signal is output to the camera body; a ninth lens connector terminal through which a second asynchronous signal that is not synchronous with the first clock signal or the second clock signal is input from the camera body; a tenth lens connector terminal through which a third asynchronous signal that is not synchronous with the first clock signal or the second clock signal is output to the camera body; an eleventh lens connector terminal through which an operating voltage, enabling reception of the first data signal from the camera body through the fourth lens connector terminal and transmission of the second data signal to the camera body through the fifth lens connector terminal based upon the first asynchronous signal output through the eighth lens connector terminal and the first clock signal input through the third lens connector terminal and also enabling transmission of the third data signal to the camera body through the seventh lens connector terminal based upon the second asynchronous signal input through the ninth lens connector terminal, the third asynchronous signal output through the tenth lens connector terminal and the second clock signal input through the sixth lens connector terminal, is provided from the camera body; and a twelfth lens connector terminal that functions as a ground terminal corresponding to the operating voltage; an interior angle formed by the contact area of the first lens connector terminal and the contact area of the eleventh lens connector terminal at the mount center point is largest among interior angles, each formed by contact areas of any two lens connector terminals among the twelve lens connector terminals at the mount center point; an interior angle formed by the contact area of the eleventh lens connector terminal and the contact area of the twelfth lens connector terminal at the mount center point is smaller than an interior angle formed by the contact area of any lens connector terminal among the first lens connector terminal through the tenth lens connector terminal and the contact area of the eleventh lens connector terminal at the mount center point; an interior angle formed by the contact area of the third lens connector terminal and the contact area of the eleventh lens connector terminal at the mount center point is smaller than an interior angle formed by the contact area of any lens connector terminal among the first lens connector terminal, the second lens connector terminal and the fourth lens connector terminal through the tenth lens connector terminal and the contact area of the eleventh lens connector terminal at the mount center point; an interior angle formed by the contact area of the fourth lens connector terminal and the contact area of the eleventh lens connector terminal at the mount center point is smaller than an interior angle formed by the contact area of any lens connector terminal among the first lens connector terminal, the second lens connector terminal and the fifth lens connector terminal through the tenth lens connector terminal and the contact area of the eleventh lens connector terminal at the mount center point; an interior angle formed by the contact area of the fifth lens connector terminal and the contact area of the eleventh lens connector terminal at the mount center point is smaller than an interior angle formed by the contact area of any lens connector terminal among the first lens connector terminal, the second lens connector terminal and the sixth lens connector terminal through the tenth lens connector terminal and the contact area of the eleventh lens connector terminal at the mount center point; an interior angle formed by the contact area of the eighth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal, the ninth lens connector terminal and the tenth lens connector terminal and the contact area of the eleventh lens connector terminal at the mount center point; an interior angle formed by the contact area of the ninth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal and the tenth lens connector terminal and the contact area of the eleventh lens connector terminal at the mount center point; an interior angle formed by the contact area of the tenth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal and the seventh lens connector terminal and the contact area of the eleventh lens connector terminal at the mount center point; an interior angle formed by the contact area of the sixth lens connector terminal and the contact area of the eleventh lens connector terminal at the mount center point is smaller than an interior angle formed by the contact area of any lens connector terminal among the first lens connector terminal, the second lens connector terminal and the seventh lens connector terminal and the contact area of the eleventh lens connector terminal at the mount center point; an interior angle formed by the contact area of the seventh lens connector terminal and the contact area of the eleventh lens connector terminal at the mount center point is smaller than an interior angle formed by the contact area of either the first lens connector terminal or the second lens connector terminal and the contact area of the eleventh lens connector terminal at the mount center point; an interior angle formed by the contact area of the second lens connector terminal and the contact area of the eleventh lens connector terminal at the mount center point is smaller than an interior angle formed by the contact area of the first lens connector terminal and the contact area of the eleventh lens connector terminal at the mount center point; and the twelve lens connector terminals are disposed in the holding portion in a staggered pattern.

An exchangeable lens according to a 9th aspect of the present invention comprises: a camera lens mount unit having a mount center point, to which a camera body, with twelve body connector terminals disposed near a camera body mount unit at the camera body, is attached; a holding portion where at least five lens connector terminals, each including a contact area to come into contact with one of the body connector terminals, are disposed; an optical system that includes a drive target member which can be driven; and a drive unit that drives the drive target member, wherein: the five lens connector terminals are: a clock input lens connector terminal through which a clock signal from the camera body is input; a data input lens connector terminal through which a first data signal from the camera body is input in synchronization with the clock signal; a data output lens connector terminal through which a second data signal is output to the camera body in synchronization with the clock signal; an asynchronous signal output lens connector terminal through which an asynchronous signal that is not synchronous with the clock signal is output to the camera body; and a voltage supply lens connector terminal through which an operating voltage, enabling reception of the first data signal from the camera body through the data input lens connector terminal and transmission of the second data signal to the camera body through the data output lens connector terminal based upon the asynchronous signal output through the asynchronous signal output lens connector terminal and the clock signal input through the clock input lens connector terminal, is provided from the camera body; an interior angle formed by the contact area of the asynchronous signal output lens connector terminal and the contact area of the voltage supply lens connector terminal at the mount center point is largest among interior angles, each formed by contact areas of any two lens connector terminals among the five lens connector terminals at the mount center point; an interior angle formed by the contact area of the clock input lens connector terminal and the contact area of the voltage supply lens connector terminal at the mount center point is smaller than an interior angle formed by the contact area of any lens connector terminal among the data input lens connector terminal, the data output lens connector terminal and the asynchronous signal output lens connector terminal and the contact area of the voltage supply lens connector terminal at the mount center point; an interior angle formed by the contact area of the data input lens connector terminal and the contact area of the voltage supply lens connector terminal at the mount center point is smaller than an interior angle formed by the contact area of either the data output lens connector terminal or the asynchronous signal output lens connector terminal and the contact area of the voltage supply lens connector terminal at the mount center point; an interior angle formed by the contact area of the data output lens connector terminal and the contact area of the voltage supply lens connector terminal is smaller than an interior angle formed by the contact area of the asynchronous signal output lens connector terminal and the contact area of the voltage supply lens connector terminal; and a distance setting apart a center of at least one lens connector terminal among the five lens connector terminals from the mount center point is different from a distance setting apart the center of at least one other lens connector terminal from the mount center point.

An exchangeable lens according to a 10th aspect of the present invention comprises: a camera lens mount unit having a mount center point, to which a camera body, with twelve body connector terminals disposed near a camera body mount unit at the camera body, is attached; a holding portion where twelve lens connector terminals, each connected to one of the twelve body connector terminals and each including a contact area to come into contact with one of the body connector terminals, are disposed; an optical system that includes a drive target member which can be driven; and a drive unit that drives the drive target member, wherein: the twelve lens connector terminals, each including an exposed area exposed at a surface of the holding portion are: a first lens connector terminal through which an drive voltage to be used to engage the drive unit in operation is provided from the camera body; a second lens connector terminal that functions as a ground terminal corresponding to the drive voltage; a third lens connector terminal through which a first clock signal from the camera body is input; a fourth lens connector terminal through which a first data signal from the camera body is input in synchronization with the first clock signal; a fifth lens connector terminal through which a second data signal is output to the camera body in synchronization with the first clock signal; a sixth lens connector terminal through which a second clock signal from the camera body is input; a seventh lens connector terminal through which a third data signal is output to the camera body in synchronization with the second clock signal; an eighth lens connector terminal through which a first asynchronous signal that is not synchronous with the first clock signal or the second clock signal is output to the camera body; a ninth lens connector terminal through which a second asynchronous signal that is not synchronous with the first clock signal or the second clock signal is input from the camera body; a tenth lens connector terminal through which a third asynchronous signal that is not synchronous with the first clock signal or the second clock signal is output to the camera body; an eleventh lens connector terminal through which an operating voltage, enabling reception of the first data signal from the camera body through the fourth lens connector terminal and transmission of the second data signal to the camera body through the fifth lens connector terminal based upon the first asynchronous signal output through the eighth lens connector terminal and the first clock signal input through the third lens connector terminal and also enabling transmission of the third data signal to the camera body through the seventh lens connector terminal based upon the second asynchronous signal input through the ninth lens connector terminal, the third asynchronous signal output through the tenth lens connector terminal and the second clock signal input through the sixth lens connector terminal, is provided from the camera body; and a twelfth lens connector terminal that functions as a ground terminal corresponding to the operating voltage; an interior angle formed by the contact area of the first lens connector terminal and the contact area of the eleventh lens connector terminal at the mount center point is largest among interior angles, each formed by contact areas of any two lens connector terminals among the twelve lens connector terminals at the mount center point; an interior angle formed by the contact area of the eleventh lens connector terminal and the contact area of the twelfth lens connector terminal at the mount center point is smaller than an interior angle formed by the contact area of any lens connector terminal among the first lens connector terminal through the tenth lens connector terminal and the contact area of the eleventh lens connector terminal at the mount center point; an interior angle formed by the contact area of the third lens connector terminal and the contact area of the eleventh lens connector terminal at the mount center point is smaller than an interior angle formed by the contact area of any lens connector terminal among the first lens connector terminal, the second lens connector terminal and the fourth lens connector terminal through the tenth lens connector terminal and the contact area of the eleventh lens connector terminal at the mount center point; an interior angle formed by the contact area of the fourth lens connector terminal and the contact area of the eleventh lens connector terminal at the mount center point is smaller than an interior angle formed by the contact area of any lens connector terminal among the first lens connector terminal, the second lens connector terminal and the fifth lens connector terminal through the tenth lens connector terminal and the contact area of the eleventh lens connector terminal at the mount center point; an interior angle formed by the contact area of the fifth lens connector terminal and the contact area of the eleventh lens connector terminal at the mount center point is smaller than an interior angle formed by the contact area of any lens connector terminal among the first lens connector terminal, the second lens connector terminal and the sixth lens connector terminal through the tenth lens connector terminal and the contact area of the eleventh lens connector terminal at the mount center point; an interior angle formed by the contact area of the eighth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal, the ninth lens connector terminal and the tenth lens connector terminal and the contact area of the eleventh lens connector terminal at the mount center point; an interior angle formed by the contact area of the ninth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal and the tenth lens connector terminal and the contact area of the eleventh lens connector terminal at the mount center point; an interior angle formed by the contact area of the tenth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal and the seventh lens connector terminal and the contact area of the eleventh lens connector terminal at the mount center point; an interior angle formed by the contact area of the sixth lens connector terminal and the contact area of the eleventh lens connector terminal at the mount center point is smaller than an interior angle formed by the contact area of any lens connector terminal among the first lens connector terminal, the second lens connector terminal and the seventh lens connector terminal and the contact area of the eleventh lens connector terminal at the mount center point; an interior angle formed by the contact area of the seventh lens connector terminal and the contact area of the eleventh lens connector terminal at the mount center point is smaller than an interior angle formed by the contact area of either the first lens connector terminal or the second lens connector terminal and the contact area of the eleventh lens connector terminal at the mount center point; an interior angle formed by the contact area of the second lens connector terminal and the contact area of the eleventh lens connector terminal at the mount center point is smaller than an interior angle formed by the contact area of the first lens connector terminal and the contact area of the eleventh lens connector terminal at the mount center point; and a distance setting apart the center of the exposed area of at least one lens connector terminal among the twelve lens connector terminals from the mount center point is different from a distance setting apart the center of the exposed area of at least one other lens connector terminal from the mount center point.

According to an 11th aspect of the present invention, in the exchangeable lens according to the 10th aspect, the twelve lens connector terminals may be disposed in the holding portion in a staggered pattern so as to achieve varying distances between centers of exposed areas of the lens connector terminals and the mount center point.

According to a 12th aspect of the present invention, in the exchangeable lens according to the 10th aspect, it is preferable that a distance setting apart the center of the exposed area of at least one lens connector terminal among the first lens connector terminal, the second lens connector terminal, the eleventh lens connector terminal and the twelfth lens connector terminal from the mount center point is different from a distance setting apart the center of the exposed area of at least one lens connector terminal among the third lens connector terminal through the tenth lens connector terminal from the mount center point.

According to a 13th aspect of the present invention, in the exchangeable lens according to the 10th aspect, it is preferable that a distance setting apart the center of the exposed area of at least one lens connector terminal among the third lens connector terminal, the fourth lens connector terminal, the fifth lens connector terminal and the eighth lens connector terminal from the mount center point is different from a distance setting apart the center of the exposed area of at least one lens connector terminal among the sixth lens connector terminal, the seventh lens connector terminal, the ninth lens connector terminal and the tenth lens connector terminal from the mount center point.

According to a 14th aspect of the present invention, in the exchangeable lens according to the 10th aspect, it is preferable that a distance setting apart the center of the exposed area of at least one lens connector terminal among the third lens connector terminal, the fourth lens connector terminal, the sixth lens connector terminal and the ninth lens connector terminal from the mount center point is different from a distance setting apart the center of the exposed area of at least one lens connector terminal among the fifth lens connector terminal, the seventh lens connector terminal, the eighth lens connector terminal and the tenth lens connector terminal from the mount center point.

According to a 15th aspect of the present invention, in the exchangeable lens according to the 10th aspect, it is preferable that a distance setting apart the center of the exposed area of at least one lens connector terminal among the third lens connector terminal, the fourth lens connector terminal, the fifth lens connector terminal, the sixth lens connector terminal and the seventh lens connector terminal from the mount center point is different from a distance setting apart the center of the exposed area of at least one lens connector terminal among the eighth lens connector terminal, the ninth lens connector terminal and the tenth lens connector terminal from the mount center point.

According to a 16th aspect of the present invention, in the exchangeable lens according to any one of the 10th through 15th aspects, the contact area of at least one lens connector terminal among the twelve lens connector terminals may include a sloping part at which the lens connector terminal comes into contact with a body connector terminal.

An exchangeable lens according to a 17th aspect of the present invention comprises: a camera lens mount unit having a mount center point, to which a camera body, with twelve body connector terminals disposed near a camera body mount unit at the camera body, is attached; a holding portion where twelve lens connector terminals, each connected to one of the twelve body connector terminals and each including a contact area to come into contact with one of the body connector terminals, are disposed; an optical system that includes a drive target member which can be driven; and a drive unit that drives the drive target member, wherein: the twelve lens connector terminals, each including an exposed area at a surface of the holding portion, are: a first lens connector terminal through which a drive voltage to be used to engage the drive unit in operation is provided from the camera body; a second lens connector terminal that functions as a ground terminal corresponding to the drive voltage; a third lens connector terminal through which a first clock signal from the camera body is input; a fourth lens connector terminal through which a first data signal from the camera body is input in synchronization with the first clock signal; a fifth lens connector terminal through which a second data signal is output to the camera body in synchronization with the first clock signal; a sixth lens connector terminal through which a second clock signal from the camera body is input; a seventh lens connector terminal through which a third data signal is output to the camera body in synchronization with the second clock signal; an eighth lens connector terminal through which a first asynchronous signal that is not synchronous with the first clock signal or the second clock signal is output to the camera body; a ninth lens connector terminal through which a second asynchronous signal that is not synchronous with the first clock signal or the second clock signal is input from the camera body; a tenth lens connector terminal through which a third asynchronous signal that is not synchronous with the first clock signal or the second clock signal is output to the camera body; an eleventh lens connector terminal through which an operating voltage, enabling reception of the first data signal from the camera body through the fourth lens connector terminal and transmission of the second data signal to the camera body through the fifth lens connector terminal based upon the first asynchronous signal output through the eighth lens connector terminal and the first clock signal input through the third lens connector terminal and also enabling transmission of the third data signal to the camera body through the seventh lens connector terminal based upon the second asynchronous signal input through the ninth lens connector terminal, the third asynchronous signal output through the tenth lens connector terminal and the second clock signal input through the sixth lens connector terminal, is provided from the camera body; and a twelfth lens connector terminal that functions as a ground terminal corresponding to the operating voltage; an interior angle formed by the contact area of the first lens connector terminal and the contact area of the eleventh lens connector terminal at the mount center point is largest among interior angles, each formed by contact areas of any two lens connector terminals among the twelve lens connector terminals at the mount center point; an interior angle formed by the contact area of the eleventh lens connector terminal and the contact area of the twelfth lens connector terminal at the mount center point is smaller than an interior angle formed by the contact area of any lens connector terminal among the first lens connector terminal through the tenth lens connector terminal and the contact area of the eleventh lens connector terminal at the mount center point; an interior angle formed by the contact area of the third lens connector terminal and the contact area of the eleventh lens connector terminal at the mount center point is smaller than an interior angle formed by the contact area of any lens connector terminal among the first lens connector terminal, the second lens connector terminal and the fourth lens connector terminal through the tenth lens connector terminal and the contact area of the eleventh lens connector terminal at the mount center point; an interior angle formed by the contact area of the fourth lens connector terminal and the contact area of the eleventh lens connector terminal at the mount center point is smaller than an interior angle formed by the contact area of any lens connector terminal among the first lens connector terminal, the second lens connector terminal and the fifth lens connector terminal through the tenth lens connector terminal and the contact area of the eleventh lens connector terminal at the mount center point; an interior angle formed by the contact area of the fifth lens connector terminal and the contact area of the eleventh lens connector terminal at the mount center point is smaller than an interior angle formed by the contact area of any lens connector terminal among the first lens connector terminal, the second lens connector terminal and the sixth lens connector terminal through the tenth lens connector terminal and the contact area of the eleventh lens connector terminal at the mount center point; an interior angle formed by the contact area of the eighth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal, the ninth lens connector terminal and the tenth lens connector terminal and the contact area of the eleventh lens connector terminal at the mount center point; an interior angle formed by the contact area of the ninth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal and the tenth lens connector terminal and the contact area of the eleventh lens connector terminal at the mount center point; an interior angle formed by the contact area of the tenth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal and the seventh lens connector terminal and the contact area of the eleventh lens connector terminal at the mount center point; an interior angle formed by the contact area of the sixth lens connector terminal and the contact area of the eleventh lens connector terminal at the mount center point is smaller than an interior angle formed by the contact area of any lens connector terminal among the first lens connector terminal, the second lens connector terminal and the seventh lens connector terminal and the contact area of the eleventh lens connector terminal at the mount center point; an interior angle formed by the contact area of the seventh lens connector terminal and the contact area of the eleventh lens connector terminal at the mount center point is smaller than an interior angle formed by the contact area of either the first lens connector terminal or the second lens connector terminal and the contact area of the eleventh lens connector terminal at the mount center point; an interior angle formed by the contact area of the second lens connector terminal and the contact area of the eleventh lens connector terminal at the mount center point is smaller than an interior angle formed by the contact area of the first lens connector terminal and the contact area of the eleventh lens connector terminal at the mount center point; and centers of the exposed areas of the twelve lens connector terminals are disposed in the holding portion in a staggered pattern.

An exchangeable lens according to an 18th aspect of the present invention comprises: a camera lens mount unit having a mount center point, to which a camera body, with twelve body connector terminals disposed near a camera body mount unit at the camera body, is attached; a holding portion where at least five lens connector terminals, each including a contact area to come into contact with one of the body connector terminals, are disposed; an optical system that includes a drive target member which can be driven; and a drive unit that drives the drive target member, wherein: the five lens connector terminals, each including an exposed area at a surface of the holding portion, are: a clock input lens connector terminal through which a clock signal from the camera body is input; a data input lens connector terminal through which a first data signal from the camera body is input in synchronization with the clock signal; a data output lens connector terminal through which a second data signal is output to the camera body in synchronization with the clock signal; an asynchronous signal output lens connector terminal through which an asynchronous signal that is not synchronous with the clock signal is output to the camera body; and a voltage supply lens connector terminal through which an operating voltage, enabling reception of the first data signal from the camera body through the data input lens connector terminal and transmission of the second data signal to the camera body through the data output lens connector terminal based upon the asynchronous signal output through the asynchronous signal output lens connector terminal and the clock signal input through the clock input lens connector terminal, is provided from the camera body; an interior angle formed by the contact area of the asynchronous signal output lens connector terminal and the contact area of the voltage supply lens connector terminal at the mount center point is largest among interior angles, each formed by contact areas of any two lens connector terminals among the five lens connector terminals at the mount center point; an interior angle formed by the contact area of the clock input lens connector terminal and the contact area of the voltage supply lens connector terminal at the mount center point is smaller than an interior angle formed by the contact area of any lens connector terminal among the data input lens connector terminal, the data output lens connector terminal and the asynchronous signal output lens connector terminal and the contact area of the voltage supply lens connector terminal at the mount center point; an interior angle formed by the contact area of the data input lens connector terminal and the contact area of the voltage supply lens connector terminal at the mount center point is smaller than an interior angle formed by the contact area of either the data output lens connector terminal or the asynchronous signal output lens connector terminal and the contact area of the voltage supply lens connector terminal at the mount center point; an interior angle formed by the contact area of the data output lens connector terminal and the contact area of the voltage supply lens connector terminal at the mount center point is smaller than an interior angle formed by the contact area of the asynchronous signal output lens connector terminal and the contact area of the voltage supply lens connector terminal at the mount center point; and a distance setting apart a center of the exposed area of at least one lens connector terminal among the five lens connector terminals from the mount center point is different from a distance setting apart a center of the exposed area of at least one other lens connector terminal from the mount center point.

According to a 19th aspect of the present invention, in the exchangeable lens according to any one of the 10th through 18th aspects, it is preferable that the holding portion includes a recess formed at the surface thereof, the twelve lens connector terminals each include a fixing part continuous to the exposed area; and the fixing part is fixed at the recess.

DESCRIPTION OF PREFERRED EMBODIMENTS

First Embodiment

Figure 1:
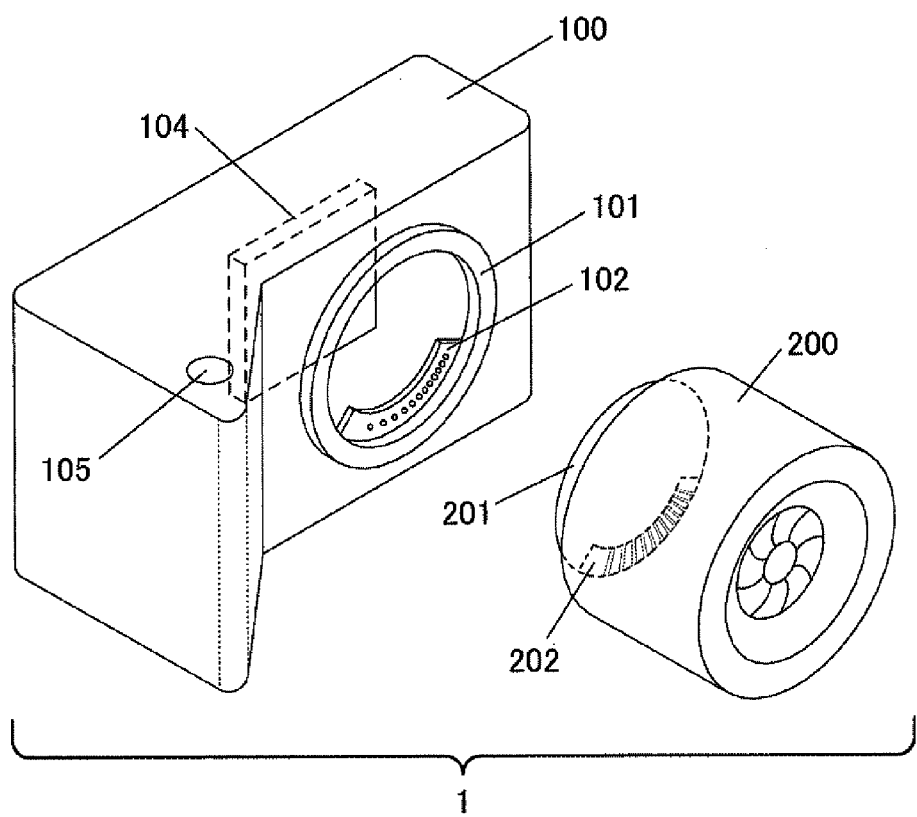
FIG. 1 is a perspective of a camera system compatible with exchangeable lenses, in which a first embodiment of the present invention is adopted.

FIG. 1 is a perspective of a camera system compatible with exchangeable lenses, achieved in the first embodiment of the present invention. It is to be noted that FIG. 1 only shows the units and devices relevant to the present invention and that an illustration and an explanation of other units and devices are not provided. A camera system 1 comprises a camera body 100 and an exchangeable lens (photographic lens) 200 that can be detachably mounted at the camera body 100.

The camera body 100 includes a camera body mount unit 101 at which the exchangeable lens 200 is detachably mounted. A holding portion (electrical connector portion) 102, projecting out on the inner circumferential side of the camera body mount unit 101 over part of the inner circumference, with twelve body connector terminals held thereat, is disposed in an area near the camera body mount unit 101 (on the inner circumferential side of the camera body mount unit 101).

In addition, a camera lens mount unit 201, corresponding to the camera body mount unit 101, at which the camera body 100 is detachably mounted, is disposed at the exchangeable lens 200. A holding portion (electrical connector portion) 202, projecting out on the inner circumferential side of the camera lens mount unit 201 over part of the inner circumference, with twelve lens connector terminals held thereat, is disposed in an area near the camera lens mount unit 201 (on the inner circumferential side of the camera lens mount unit 201).

As the exchangeable lens 200 is engaged with the camera body 100, the plurality of body connector terminals disposed at the holding portion 102 (to be described in detail later) become electrically and physically connected with the plurality of lens connector terminals disposed at the holding portion 202 (to be described in detail later). These terminals are used to provide power from the camera body 100 to the exchangeable lens 200 and to exchange signals between the camera body 100 and the exchangeable lens 200.

An image sensor 104 is disposed inside the camera body 100 at a position rearward relative to the camera body mount unit 101. A button 105, functioning as an input device, is disposed on the top side of the camera body 100. The user is able to issue a photographing instruction, a photographing condition setting instruction or the like to the camera body 100 by operating an input device such as the button 105.

Figure 2:
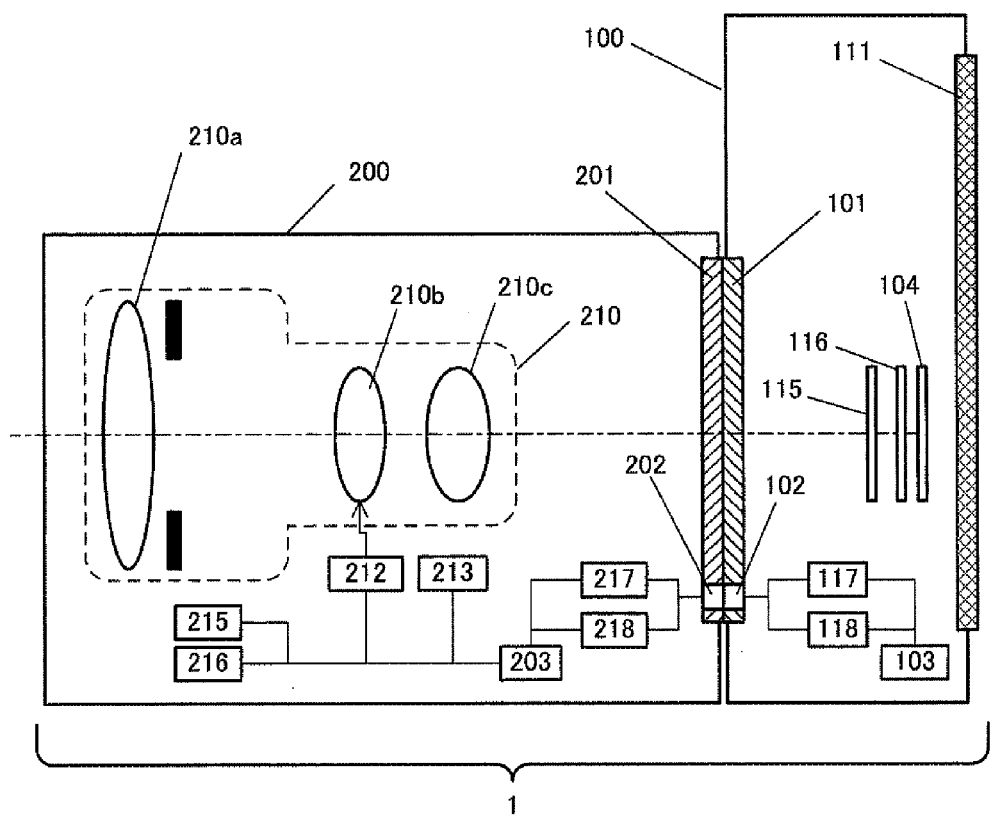
FIG. 2 is a sectional view of the camera system compatible with exchangeable lenses, in which the first embodiment of the present invention is adopted.

FIG. 2 is a sectional view of the camera system 1 compatible with exchangeable lenses achieved in the first embodiment of the present invention. The exchangeable lens 200 includes an image forming optical system 210 via which a subject image is formed. The image forming optical system 210 is constituted with a plurality of lenses 210a through 210c. The plurality of lenses 210a through 210c includes a focusing lens 210b.

A lens control unit 203, which controls the various components constituting the exchangeable lens 200, is disposed inside the exchangeable lens 200. The lens control unit 203 comprises a microcomputer, its peripheral circuits and the like (none shown). A first lens-side communication unit 217, a second lens-side communication unit 218, a lens drive unit 212, a lens position detection unit 213, a ROM 215 and a RAM 216 are connected to the lens control unit 203.

The first lens-side communication unit 217 and the second lens-side communication unit 218 exchange data with the camera body 100 via terminals at the holding portions 102 and 202. The first lens-side communication unit 217 and the second lens-side communication unit 218 each function as a communication interface for the exchangeable lens 200. The lens control unit 203 engages in various types of communication (hotline communication and command data communication) with the camera body 100 (with a body control unit 103 to be described in detail later) via these communication interfaces, as will be explained later.

The lens drive unit 212, which includes an actuator such as a stepping motor, drives the focusing lens 210b in response to a signal input to the lens drive unit 212. The lens position detection unit 213 detects the position of the focusing lens 210b by, for instance, counting the number of signal pulses input to the stepping motor in the lens drive unit 212. It may instead detect the position of the focusing lens 210b via a distance encoder or the like of the known art disposed at the exchangeable lens 200.

It is to be noted that a drive target member other than the focusing lens 210b described above may be disposed in the exchangeable lens 200. For instance, a zoom lens, which is allowed to move along the optical axis of the exchangeable lens 200 (the image forming optical system 210), as is the focusing lens 210b, may be included in the exchangeable lens 200, together with a mechanism (widely known as a power zoom mechanism) that electrically drives the zoom lens. In addition, a blur correction mechanism equipped with a blur correction lens, movable along directions that include directional components (X and Y direction components) perpendicular to the optical axis of the image forming optical system 210, which corrects image blur by driving the blur correction lens, may be disposed in the exchangeable lens 200. Furthermore, an aperture drive mechanism for controlling drive of an aperture member (aperture blades) that can be moved so as to alter the size of an aperture opening, through which a subject light flux passes, may be disposed in the exchangeable lens 200. The lens control unit 203 in an exchangeable lens that includes such drive target members controls the drive and the position detection executed for the individual drive target members, i.e., the blur correction lens, the aperture member and the zoom lens, via the lens drive unit 212 and the lens position detection unit 213.

The ROM 215 is a nonvolatile storage medium into which a specific control program, to be executed by the lens control unit 203, and the like are stored in advance. The RAM 216 is a volatile storage medium used by the lens control unit 203 as a storage area where various types of data are stored.

A shutter 115, via which the exposure conditions at the image sensor 104 are controlled, and an optical filter 116, which is an integrated filter achieved by combining an optical low pass filter and an infrared cut-off filter, are disposed in front of the image sensor 104. The subject light having been transmitted through the image forming optical system 210 enters the image sensor 104 via the shutter 115 and the filter 116.

The body control unit 103, engaged in control of the various components of the camera body 100, is disposed inside the camera body 100. The body control unit 103 is constituted with a microcomputer, a RAM, peripheral circuits and the like (none shown).

A first body-side communication unit 117 and a second body-side communication unit 118 are connected to the body control unit 103. The first body-side communication unit 117 is connected to the holding portion 102 and is able to exchange data with the first lens-side communication unit 217. The second body-side communication unit 118 is likewise able to exchange data with the second lens-side communication unit 218. Namely, the first body-side communication unit 117 and the second body-side communication unit 118 each function as a body-side communication interface. The body control unit 103 engages in various types of communication (hotline communication and command data communication) with the exchangeable lens 200 (with the lens control unit 203) via these communication interfaces, as will be explained later.

A display device 111 constituted with an LCD panel or the like is disposed at the rear surface of the camera body 100. The body control unit 103 brings up on display at the display device 111 a subject image (referred to as a live view image) based upon an output from the image sensor 104 or various types of menu screens enabling selection of photographing conditions and the like.

(Description of the Holding Portions 102 and 202)

Figure 3:
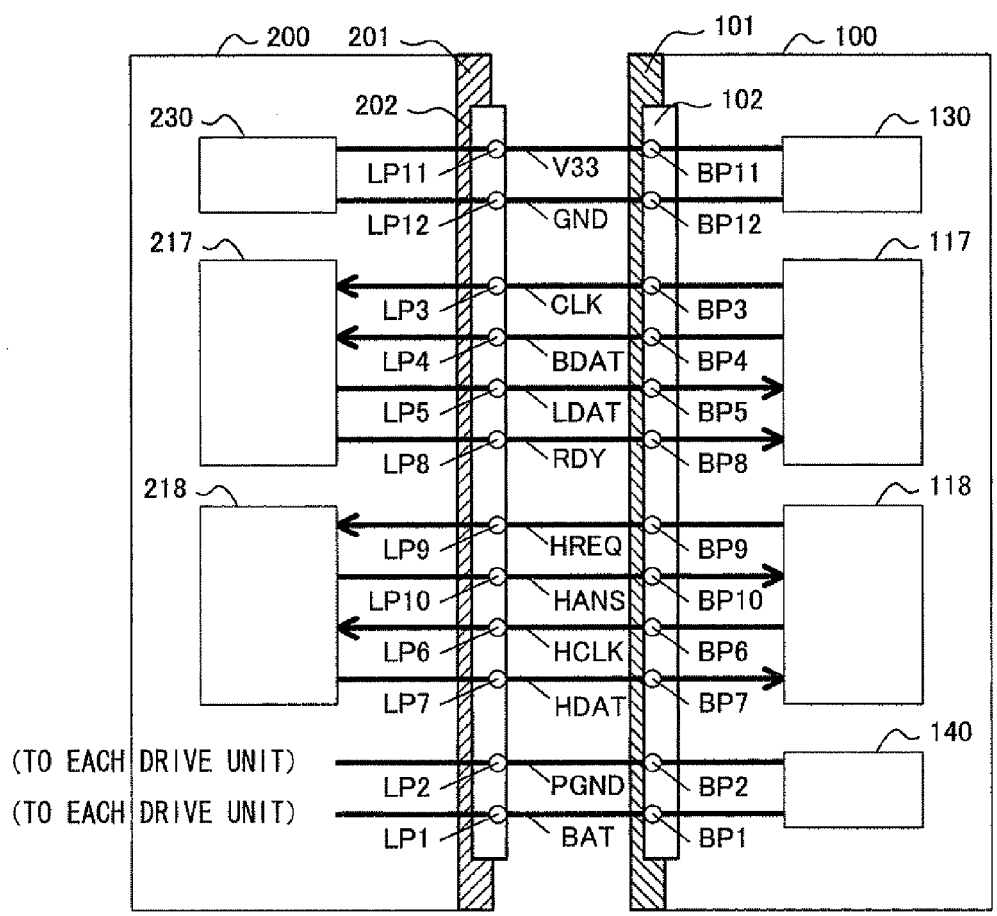
FIG. 3 is a schematic diagram showing in detail holding portions.

FIG. 3 is a schematic diagram showing structural details of the holding portions 102 and 202. As shown in FIG. 3, twelve body connector terminals BP1 through 1012 are present at the holding portion 102. In addition, twelve lens connector terminals LP1 through LP12, each corresponding to one of the twelve body connector terminals at the holding portion 102, are present at the holding portion 202.

The eleventh body connector terminal BP11 and the twelfth body connector terminal BP12 are connected to a first power supply circuit 130 located in the camera body 100. The first power supply circuit 130 provides an operating voltage to the eleventh body connector terminal BP11, via which the operating voltage is supplied to various components disposed in the exchangeable lens 200 except for the lens drive unit 212. In other words, an operating voltage, on which the various components in the exchangeable lens 200 (including the first lens-side communication unit 217 and the second lens-side communication unit 218) except for the lens drive unit 212 operate, is provided via the eleventh body connector terminal BP11 and the eleventh lens connector terminal LP11. While a specific range (e.g., a voltage range from 3 to 4 v), defined by a minimum voltage value and a maximum voltage value, is assumed for the voltage value representing the level of voltage that can be provided to the eleventh body connector terminal BP11, the voltage value of the voltage typically provided to the eleventh body connector terminal BP11 is close to the median of the maximum voltage value and the minimum voltage value. The value of the electric current provided from the camera body 100 to the exchangeable lens 200 in conjunction with the operating voltage will be in the range of approximately several tens of mA to several hundreds of mA in a power ON state.

The twelfth body connector terminal BP12 is a ground terminal that corresponds to the operating voltage provided to the eleventh body connector terminal BP11. Namely, the twelfth body connector terminal BP12 and the twelfth lens connector terminal LP12 are ground terminals that correspond to the operating voltage.

In the following description, the signal line formed with the eleventh body connector terminal BP11 and the eleventh lens connector terminal LP11 will be referred to as a signal line V33. The signal line formed with the twelfth body connector terminal BP12 and the twelfth lens connector terminal LP12 will be referred to as a signal line GND. The eleventh lens connector terminal LP11, the twelfth lens connector terminal LP12, the eleventh body connector terminal BP11 and the twelfth body connector terminal BP12 are power supply system connector terminals used to provide power from the camera body 100 to the exchangeable lens 200.

The third body connector terminal BP3, the fourth body connector terminal BP4, the fifth body connector terminal BP5 and the eighth body connector terminal BP8 are connected to the first body-side communication unit 117. The third lens connector terminal LP3, the fourth lens connector terminal LP4, the fifth lens connector terminal LP5 and the eighth lens connector terminal LP8 at the exchangeable lens 200, corresponding to the body connector terminals BP3, BP4, BP5 and BP8, are connected to the first lens-side communication unit 217. The first body-side communication unit 117 and the first lens-side communication unit 217 exchange data with each other via these terminals (communication system terminals). The communication carried out by the first body-side communication unit 117 and the first lens-side communication unit 217 will be described in detail later.

It is to be noted that the signal line formed with the third body connector terminal BP3 and the third lens connector terminal LP3 will be referred to as a signal line CLK in the following description. In addition, the signal line formed with the fourth body connector terminal BP4 and the fourth lens connector terminal LP4 will be referred to as a signal line BDAT, the signal line formed with the fifth body connector terminal BP5 and the fifth lens connector terminal LP5 will be referred to as a signal line LDAT and the signal line formed with the eighth body connector terminal BP8 and the eighth lens connector terminal LP8 will be referred to as a signal line RDY.

The ninth body connector terminal BP9, the tenth body connector terminal BP10, the sixth body connector terminal BP6 and the seventh body connector terminal BP7 are connected to the second body-side communication unit 118. The ninth lens connector terminal LP9, the tenth lens connector terminal LP10, the sixth lens connector terminal LP6 and the seventh lens connector terminal LP7 at the exchangeable lens 200, corresponding to these body connector terminals, are connected to the second lens-side communication unit 218. The second lens-side communication unit 218 transmits data to the second body-side communication unit 118 via these terminals (communication system terminals). The communication carried out by the second body-side communication unit 118 and the second lens-side communication unit 218 will be described in detail later.

It is to be noted that the signal line formed with the ninth body connector terminal BP9 and the ninth lens connector terminal LP9 will be referred to as a signal line HREQ. In addition, the signal line formed with the tenth body connector terminal BP10 and the tenth lens connector terminal LP10 will be referred to as a signal line HANS, the signal line formed with the sixth body connector terminal BP6 and the sixth lens connector terminal LP6 will be referred to as a signal line HCLK and the signal line formed with the seventh body connector terminal BP7 and the seventh lens connector terminal LP7 will be referred to as a signal line HDAT.

The first body connector terminal BP1 and the second body connector terminal BP2 are connected to a second power supply circuit 140 located in the camera body 100. The second power supply circuit 140 provides a drive voltage, to be used to drive the lens drive unit 212, to the first body connector terminal BP1. In other words, the drive voltage for the lens drive unit 212 is provided via the first body connector terminal BP1 and the first lens connector terminal LP1. While the voltage value indicating the level of voltage that can be provided to the first body connector terminal BP1 assumes a range defined by a minimum voltage value and a maximum voltage value, the voltage value is never smaller than the voltage value indicating the level of voltage that can be provided to the eleventh body connector terminal BP11 assuming its own specific voltage value range as has been explained earlier. For instance, the maximum voltage value indicating the highest level of voltage that can be provided to the first body connector terminal BP1 may be several times the maximum voltage value indicating the highest level of voltage that can be supplied to the eleventh body connector terminal BP11. In other words, the voltage value indicating the level of voltage provided to the first body connector terminal BP1 is always different from the voltage value indicating the level of voltage provided to the eleventh body connector terminal BP11. It is to be noted that the voltage value indicating the level of voltage provided to the first body connector terminal BP1 under normal circumstances is close to the median of the maximum voltage value and the minimum voltage value assumed for the first body connector terminal BP1. The value of the electric current provided from the camera body 100 to the exchangeable lens 200 in conjunction with the drive voltage will be in the range of approximately several tens of mA to several A in the power ON state.

The second body connector terminal BP2 is a ground terminal that corresponds to the drive voltage provided to the first body connector terminal BP1. Namely, the second body connector terminal BP2 and the second lens connector terminal LP2 are ground terminals that correspond to the drive voltage.

In the following description, the signal line formed with the first body connector terminal BP1 and the first lens connector terminal LP1 will be referred to as a signal line BAT. The signal line formed with the second body connector terminal BP2 and the second lens connector terminal LP2 will be referred to as a signal line PGND. The first body connector terminal BP1, the first lens connector terminal LP1, the second body connector terminal BP2 and the second lens connector terminal LP2 are power supply system terminals used to provide power from the camera body 100 to the exchangeable lens 200.

It is to be noted that as the varying ranges assumed for the voltage value (current value) indicating the level of voltage provided via the first body connector terminal BP1 and the first lens connector terminal LP1 and for the voltage value (current value) indicating the level of voltage provided via the eleventh body connector terminal BP11 and the eleventh lens connector terminal LP11 clearly indicate, the difference between the maximum value and the minimum value taken for the electric current flowing through the second body connector terminal BP2 and the second lens connector terminal LP2, i.e., through the ground terminals corresponding to the voltage provided through the connector terminals BP1 and LP1, is greater than the difference between the maximum value and the minimum value taken for the electric current flowing through the twelfth body connector terminal BP12 and the twelfth lens connector terminal LP12, i.e., the ground terminals corresponding to the voltage provided through the connector terminals BP11 and LP11. A greater difference is assumed between the maximum value and the minimum value taken for the electric current flowing through the connector terminals BP2 and LP2, since greater power is used in the lens drive unit 212 equipped with a drive system such as an actuator, compared to the power used in the electronic circuits, e.g., the lens control unit 203, in the exchangeable lens 200 and also, the lens drive unit 212 does not use any power at all if it does not need to drive the focusing lens 210b.

Figure 4A:
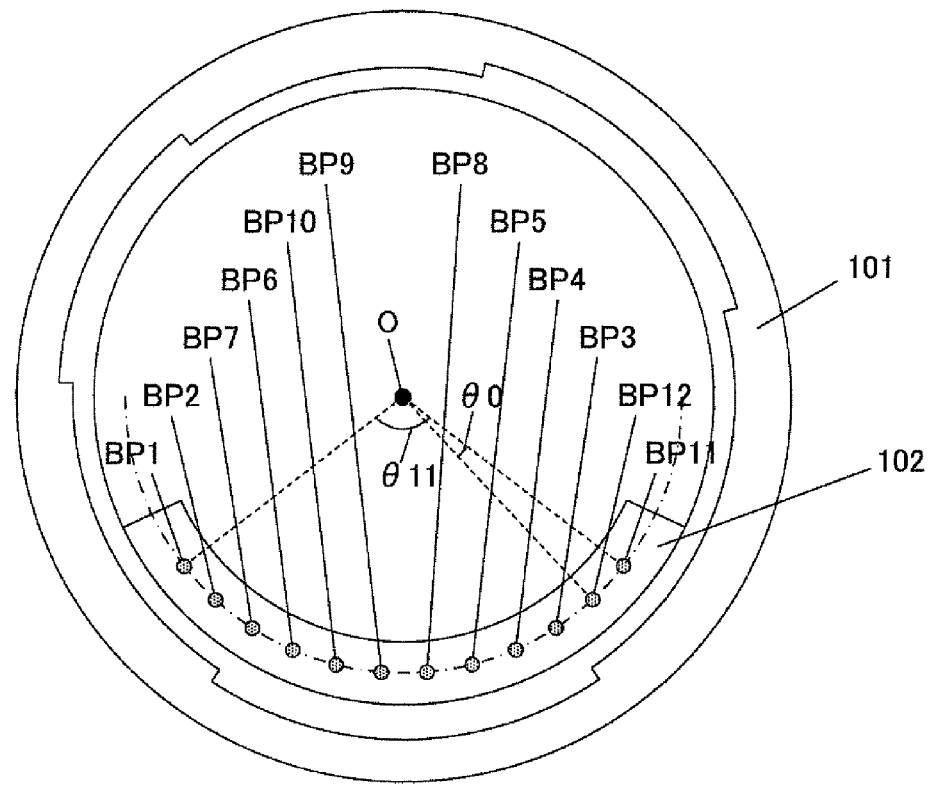
FIGS. 4A and 4B respectively show a camera body mount unit in a front view and associated holding portion in an enlarged view.
Figure 4B:
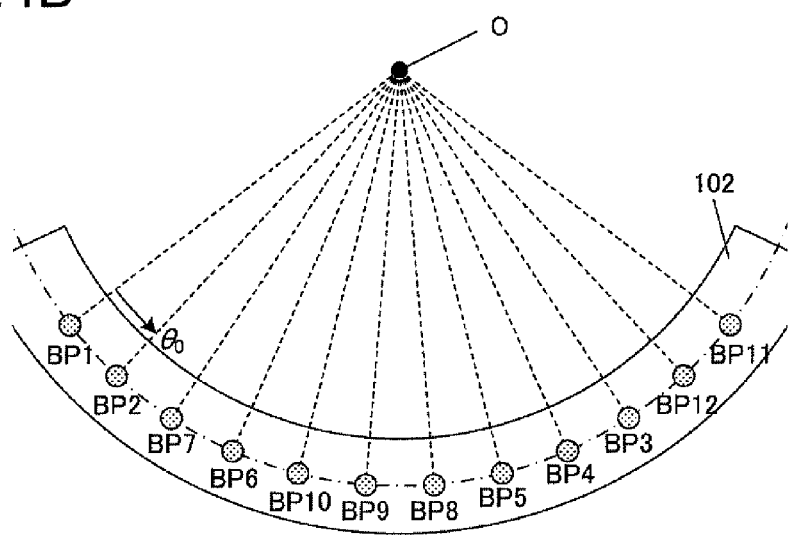
Figure 5A:
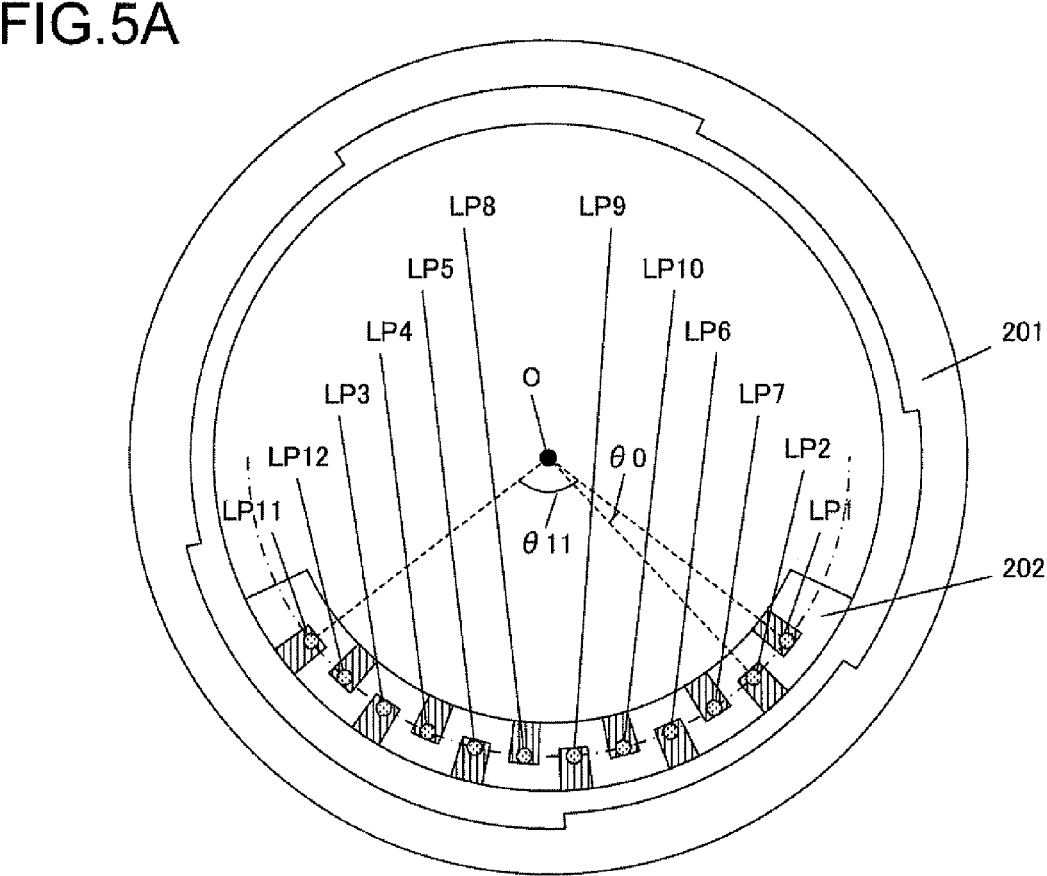
FIGS. 5A and 5B respectively show a camera lens mount unit in a front view and associated holding portion in an enlarged view.
Figure 5B:
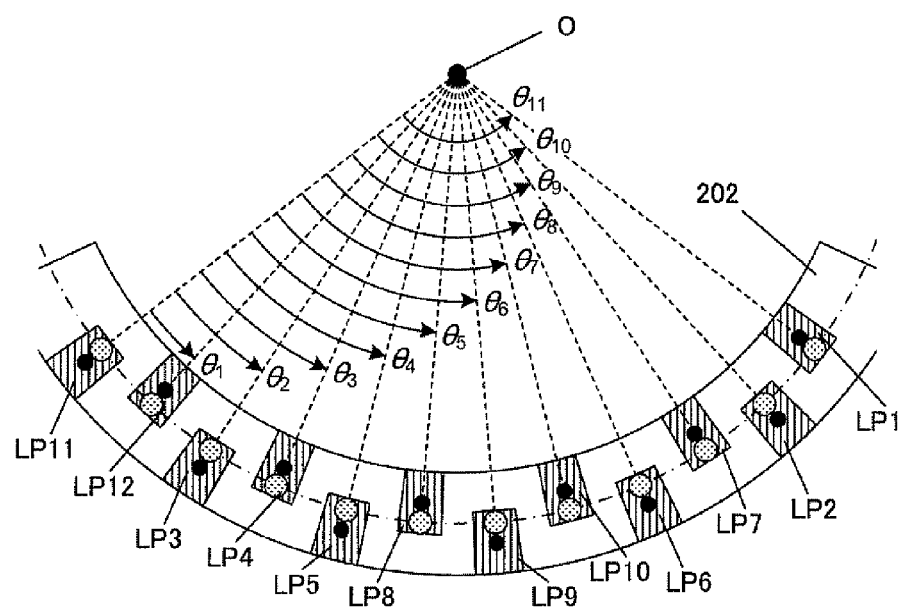

FIGS. 4A and 4B show the camera body mount unit 101 in front views. FIG. 4A shows the camera body mount unit 101 at the camera body 100 viewed from the side where the exchangeable lens 200 is present, whereas FIG. 4B shows the holding portion 102 in FIG. 4A in an enlargement. FIGS. 5A and 5B show the camera lens mount unit 201 in front views. FIG. 5A shows the camera lens mount unit 201 at the exchangeable lens 200 viewed from the side where the camera body 100 is present, whereas FIG. 5B shows the holding portion 202 in FIG. 5A in an enlargement. The mount units each assume a circular shape and the center of the circle will be referred to as a mount center point O in the following description.

As shown in FIG. 4A, the holding portion 102 is disposed at a position inward relative to the mount surface of the camera body mount unit 101 (deeper into the drawing sheet on which FIG. 4A is provided). In addition, FIG. 5A indicates that the holding portion 202 is disposed at a position outward relative to the mount surface of the camera lens mount unit 201 (toward the person viewing FIG. 5A). The holding portion 102 and the holding portion 202 are connected as the camera body 100 and the exchangeable lens 200 are coupled by placing the mount surface of the camera body mount unit 101 in contact with the mount surface of the camera lens mount unit 201. Once the holding portions 102 and 202 are thus connected, the twelve body connector terminals BP1 through BP12 and the twelve lens connector terminals LP1 through LP12 disposed at the two holding portions become connected with each other. The one-point chain lines, drawn over the twelve body connector terminals BP1 through BP12 and the twelve lens connector terminals LP1 through LP12 in FIGS. 4A and 4B and FIGS. 5A and 5B indicate a locus through which the twelve body connector terminals BP1 through BP12 move when the camera body 100 is coupled with the exchangeable lens 200. Since this mount structure is of the known art, further explanation is not provided.

As shown in FIG. 4A, the twelve body connector terminals BP1 through BP12 each assume a cylindrical shape and a force imparted from a spring or the like disposed inside the holding portion 102 presses them toward the front of the camera body mount unit 101 (toward the exchangeable lens 200). In addition, as shown in FIG. 5A, the twelve lens connector terminals LP1 through LP12 each include a substantially rectangular conductor exposed at the surface of the holding portion 202. Once the holding portion 102 is connected with the holding portion 202, the body connector terminals are each pressed against a lens connector terminal by the force imparted from the spring or the like as described above and thus, electrical continuity is achieved between the lens connector terminals and the body connector terminals. It is to be noted that the circles drawn over the twelve lens connector terminals LP1 through LP12 in FIG. 5A and FIG. 5B indicate the positions at which the corresponding body connector terminals are pressed against the lens connector terminals.

In the following description, the particular area of each of the twelve lens connector terminals LP1 through LP12 that comes into contact with the corresponding body connector terminal when the camera body 100 and the exchangeable lens 200 are engaged with each other will be referred to as a contact area (an area indicated by each of the circles in FIG. 5A). In addition, the phrase "when the camera body 100 and the exchangeable lens 200 are engaged with each other" is used to refer to a state in which a voltage is supplied from the eleventh body connector terminal BP11 to the eleventh lens connector terminal LP11. It is to be noted that the term "lens connector terminal" used in the description of the embodiment refers to an entire terminal that includes an electrical wiring (a lead wire, a flexible cable or the like) used to connect the substantially rectangular area (which includes the contact area) exposed at the surface of the holding portion 202, indicated as a shaded area in FIG. 5A, with the first lens-side communication unit 217 or the second lens-side communication unit 218, as well as the rectangular area itself. In addition, the areas of the lens connector terminals LP1 through LP12 exposed at the surface of the holding portion 202, indicated as the shaded areas as explained above, may be referred to as "exposed areas" of the lens connector terminals LP1 through LP12 in the following description. The expression "the center of a lens connector terminal" used in the following description refers to the center of the exposed area of the particular lens connector terminal, indicated as a filled circle in FIG. 5B. It is to be noted that the exposed areas will be described in detail later in reference to FIG. 15.

As shown in FIG. 5A, the twelve lens connector terminals LP1 through LP12 (the exposed areas of the twelve lens connector terminals) are set in the holding portion 202 of the camera lens mount unit 201 in a staggered pattern that forms a circular arc centered on the mount center point O and ranging along the camera lens mount unit 201 (along part of the camera lens mount unit 201 assuming a substantially circular shape on the outside). Namely, the twelve lens connector terminals LP1 through LP12 (the exposed areas of the twelve lens connector terminals) include those disposed closer to the inner circumferential side of the holding portion 202 (the side closer to the mount center point O) and those disposed closer to the outer circumferential side of the holding portion 202 (the side further away from the mount center point O), which are set in a staggered pattern at the holding portion 202. In other words, the twelve lens connector terminals LP1 through LP12 (their exposed areas) are disposed so that the distance between the mount center point O and the centers of six lens connector terminals (their exposed areas) is different from the distance between the mount center point O and the centers of the other six lens connector terminals (their exposed areas).

The twelve lens connector terminals LP1 through LP12 (their exposed areas) in the embodiment are disposed so that the contact areas of the individual lens connector terminals are set over equal intervals. An angle θ11 defined by the circular arc (i.e., the angle formed by connecting the mount center point O, the center of the first lens connector terminal LP1 (its exposed area) and the center of the eleventh lens connector terminal LP11 (its exposed area) is approximately 105°, whereas an angle θ0 defined by the circular arc connecting one contact area to the next contact area is approximately 9.5°. In addition, the twelve lens connector terminals LP1 through LP12 in the embodiment each assume a width of approximately 1.5 mm measured along the direction in which the circular arc ranges. Since the distance between the mount center point O and the center of the contact area in each of the lens connector terminals LP1 through LP12 is approximately 15 mm, the distance between the centers of each two consecutive lens connector terminals, among the lens connector terminals LP1 through LP12, measured along the direction in which the circular arc ranges, is approximately 2.5 mm. Furthermore, since the lens connector terminals LP1 through LP12 achieve a width of approximately 1.5 mm measured along the direction in which the circular arc ranges, the lens connector terminals LP1 through LP12 are set apart from one another with clearances measuring approximately 1 mm along the direction in which the circular arc ranges.

It is to be noted that the width of the lens connector terminals LP1 through LP12 (the width of their exposed areas) and the clearance between the individual lens connector terminals LP1 through LP12 can be altered to optimal values as necessary. For instance, the width of the lens connector terminals LP1 through LP12 (the width of their exposed areas), measured along the direction in which the circular arc ranges, may be increased or decreased in units of ⅒ mm (in units of 0.1 mm). In correspondence, the width of the clearance between the lens connector terminals, measured along the direction in which the circular arc ranges, may be adjusted to an optimal value in units of ⅒ mm (in units of 0.1 mm, e.g., ±0.2 mm).

Next, in reference to FIG. 5B, the positional relationship among the twelve lens connector terminals LP1 through LP12 (their exposed areas) will be described. The interior angle θ11, formed by the contact area of the first lens connector terminal LP1 and the contact area of the eleventh lens connector terminal LP11 at the mount center point O, is the largest among interior angles, each formed by the contact areas of any two randomly selected lens connector terminals among the twelve lens connector terminals LP1 through LP12 at the mount center point O.

An interior angle θ1, formed by the contact area of the eleventh lens connector terminal LP11 and the contact area of the twelfth lens connector terminal LP12 at the mount center point O, is smaller than interior angles θ2 through θ11 each formed by the contact area of a given lens connector terminal among the first lens connector terminal LP1 through the tenth lens connector terminal LP10 and the contact area of the eleventh lens connector terminal LP11 at the mount center point O. The interior angle θ2, formed by the contact area of the third lens connector terminal LP3 and the contact area of the eleventh lens connector terminal LP11 at the mount center point O, is smaller than the interior angles θ3 through θ11 each formed by the contact area of a given lens connector terminal among the first lens connector terminal LP1, the second lens connector terminal LP2 and the fourth lens connector terminal LP4 through the tenth lens connector terminal LP10 and the contact area of the eleventh lens connector terminal LP11 at the mount center point O.

The interior angle θ3, formed by the contact area of the fourth lens connector terminal LP4 and the contact area of the eleventh lens connector terminal LP11 at the mount center point O, is smaller than the interior angles θ4 through θ11 each formed by the contact area of a given lens connector terminal among the first lens connector terminal LP1, the second lens connector terminal LP2 and the fifth lens connector terminal LP5 through the tenth lens connector terminal LP10 and the contact area of the eleventh lens connector terminal LP11 at the mount center point O. The interior angle θ4, formed by the contact area of the fifth lens connector terminal LP5 and the contact area of the eleventh lens connector terminal LP11 at the mount center point O, is smaller than the interior angles θ5 through θ11 each formed by the contact area of a given lens connector terminal among the first lens connector terminal LP1, the second lens connector terminal LP2 and the sixth lens connector terminal LP6 through the tenth lens connector terminal LP10 and the contact area of the eleventh lens connector terminal LP11 at the mount center point O.

The interior angle θ5, formed by the contact area of the eighth lens connector terminal LP8 and the contact area of the eleventh lens connector terminal LP11 at the mount center point O, is smaller than the interior angles θ6 through θ11 each formed by the contact area of a given lens connector terminal among the first lens connector terminal LP1, the second lens connector terminal LP2, the sixth lens connector terminal LP6, the seventh lens connector terminal LP7, the ninth lens connector terminal LP9 and the tenth lens connector terminal LP10 and the contact area of the eleventh lens connector terminal LP11 at the mount center point O. The interior angle θ6, formed by the contact area of the ninth lens connector terminal LP9 and the contact area of the eleventh lens connector terminal LP11 at the mount center point O, is smaller than the interior angles θ7 through θ11 each formed by the contact area of a given lens connector terminal among the first lens connector terminal LP1, the second lens connector terminal LP2, the sixth lens connector terminal LP6, the seventh lens connector terminal LP7 and the tenth lens connector terminal LP10 and the contact area of the eleventh lens connector terminal LP11 at the mount center point O.

The interior angle θ7, formed by the contact area of the tenth lens connector terminal LP10 and the contact area of the eleventh lens connector terminal LP11 at the mount center point O, is smaller than the interior angles θ8 through θ11 each formed by the contact area of a given lens connector terminal among the first lens connector terminal LP1, the second lens connector terminal LP2, the sixth lens connector terminal LP6 and the seventh lens connector terminal LP7 and the contact area of the eleventh lens connector terminal LP11 at the mount center point O. The interior angle θ8, formed by the contact area of the sixth lens connector terminal LP6 and the contact area of the eleventh lens connector terminal LP11 at the mount center point O, is smaller than the interior angles θ9 through θ11 each formed by the contact area of a given lens connector terminal among the first lens connector terminal LP1, the second lens connector terminal LP2 and the seventh lens connector terminal LP7 and the contact area of the eleventh lens connector terminal LP11 at the mount center point O.

The interior angle θ9, formed by the contact area of the seventh lens connector terminal LP7 and the contact area of the eleventh lens connector terminal LP11 at the mount center point O, is smaller than the interior angles θ10 and θ11 each formed by the contact area of either the first lens connector terminal LP1 or the second lens connector terminal LP2 and the contact area of the eleventh lens connector terminal LP11 at the mount center point O. The interior angle θ10, formed by the contact area of the second lens connector terminal LP2 and the contact area of the eleventh lens connector terminal LP at the mount center point O, is smaller than the interior angle θ11 formed by the contact area of the first lens connector terminal LP1 and the contact area of the eleventh lens connector terminal LP11 at the mount center point O.

The twelve lens connector terminals LP1 through LP12 (their exposed areas) are disposed at the holding portion 202 so as to achieve the positional relationship described above. It is to be noted that the second lens connector terminal LP2 and the twelfth lens connector terminal LP12, used as ground terminals in conjunction with the first lens connector terminal LP1 and the eleventh lens connector terminal LP11 in the power supply systems through which source voltages (the operating voltage and the drive voltage described earlier) are provided, are set between the first lens connector terminal LP1 and the third lens connector terminal LP3 through the tenth lens connector terminal LP10, i.e., terminals in the communication systems (communication system terminals) and between the eleventh lens connector terminal LP11 and the communication system terminals, so as to minimize the extent to which the communication system terminals (signal lines) are affected by the power supply system terminals (signal lines).

The signal lines through which the source voltages are supplied (the signal lines running through the first lens connector terminal LP1 and the eleventh lens connector terminal LP11) are each bound to manifest a significant voltage change as the load on the source voltage recipient fluctuates. Such a significant voltage change may adversely affect the communication system signal lines. This adverse effect is minimized in the embodiment by disposing the ground terminals (the second lens connector terminal LP2 and the twelfth lens connector terminal LP12), at which voltages tend to remain stable compared to the power supply terminals (the first lens connector terminal LP1 and the eleventh lens connector terminal LP11), between the communication system terminals (the third lens connector terminal LP3 through the tenth lens connector terminal LP10) and the power supply terminals (the first lens connector terminal LP1 and the eleventh lens connector terminal LP11).

While the group of lens connector terminals connected to the first lens-side communication unit 217, i.e., the third lens connector terminal LP3, the fourth lens connector terminal LP4, the fifth lens connector terminal LP5 and the eighth lens connector terminal LP8, is disposed next to the group of lens connector terminals connected to the second lens-side communication unit 218, i.e., the ninth lens connector terminal LP9, the tenth lens connector terminal LP10, the sixth lens connector terminal LP6 and the seventh lens connector terminal LP7, none of the third lens connector terminal LP3, the fourth lens connector terminal LP4 and the fifth lens connector terminal LP5, connected to the first lens-side communication unit 217, and the sixth lens connector terminal LP6 and the seventh lens connector terminal LP7, connected to the second lens-side communication unit 218, occupies a position next to a terminal connected to a different (other) communication unit (217 or 218). In other words, the eighth lens connector terminal LP8, the ninth lens connector terminal LP9 and the tenth lens connector terminal LP10 are disposed in close proximity to each other, each occupying a position close to a terminal connected to the different (other) communication unit. This positional arrangement is adopted since signals that are not synchronous with a clock signal are transmitted through the eighth lens connector terminal LP8, the ninth lens connector terminal LP9 and the tenth lens connector terminal LP10, as will be described in detail later. A signal that is not synchronous with a clock signal manifests less change compared to the clock signal or a signal synchronous with the clock signal, e.g., a signal manifesting a status change of approximately 1 kHz to several kHz per unit time. Under normal circumstances, a clock signal and a signal synchronous with the clock signal manifest significant changes per unit time of up to several MHz (e.g., a clock signal may manifest an 8 MHz change and a data signal synchronous with the clock signal may manifest a 4 MHz change (depending upon the data volume)) and thus, such changes tend to result in noise. Accordingly, it is desirable to dispose each of the terminals, through which a clock signal or a signal synchronous with the clock signal is transmitted, away from any terminal connected to the different (other) communication unit, so as to minimize the adverse effect on communication. In the embodiment, such a positional arrangement is achieved by disposing the group of terminals (the eighth lens connector terminal LP8, the ninth lens connector terminal LP9 and the tenth lens connector terminal LP10), through which signals asynchronous with a clock signal are transmitted, between the group of terminals (the third lens connector terminal LP3, the fourth lens connector terminal LP4 and the fifth lens connector terminal LP5) through which a clock signal and signals synchronous with the clock signal are transmitted in the first lens-side communication unit 217 and the group of terminals (the sixth lens connector terminal LP6 and the seventh lens connector terminal LP7) through which a clock signal and a signal synchronous with the clock signal are transmitted in the second lens-side communication unit 218.

The ninth lens connector terminal LP9, the tenth lens connector terminal LP10, the sixth lens connector terminal LP6 and the seventh lens connector terminal LP7, less affected by noise, are disposed further toward the second power supply circuit 140, whereas the third lens connector terminal LP3, the fourth lens connector terminal LP4, the fifth lens connector terminal LP5 and the eighth lens connector terminal LP8 are disposed further toward the first power supply circuit 130. The level of power consumption in the lens drive unit 212, to which power is supplied via the second power supply circuit 140, changes greatly depending upon whether or not the lens drive unit 212 is engaged in drive of the focusing lens 210b. This means that the level of electric current flowing through the second lens connector terminal LP2 tends to fluctuate greatly and such a change in the electric current is bound to affect any communication system terminals in the vicinity to an extent greater than a change in the electric current flowing through the twelfth lens connector terminal LP12 would. However, communication is carried out via the lens connector terminals LP9, LP10, LP6 and LP7 over cycles shorter than those of the communication carried out via the lens connector terminals LP3, LP4, LP5 and LP8, as will be explained in further detail later. Thus, even if a communication failure occurs due to a change in the electric current flowing through the second lens connector terminal LP2, the communication can be re-executed promptly. The communication is carried out via the lens connector terminals LP9, LP10, LP6 and LP7 over cycles approximately equal to or less than one tenth of the cycles of the communication carried out via the lens connector terminals LP3, LP4, LP5 and LP8. As will be described in detail later, the communication through the lens connector terminals LP9, LP10, LP6 and LP7 is carried out over 1 ms cycles and the communication through the lens connector terminals LP3, LP4, LP5 and LP8 is carried out over 16 ms cycles in the embodiment. This means that the lens connector terminals LP9, LP10, LP6 and LP7 can be disposed next to the second lens connector terminal LP2 without subjecting them to any significant adverse effect of noise, to which the lens connector terminals LP3, LP4, LP5 and LP8 would be subjected if they were disposed next to the second lens connector terminal LP2.

In addition, the second lens connector terminal LP2 is disposed next to the seventh lens connector terminal LP7, which assures a higher level of noise tolerance compared to the sixth lens connector terminal LP6. As will be described in detail later, a clock signal and a data signal synchronous with the clock signal are respectively transmitted through the sixth lens connector terminal LP6 and the seventh lens connector terminal LP7. If the leading edge or the trailing edge of the clock signal becomes indefinite due to noise, accurate synchronization will not be achieved on the reception side. The signal level of the data signal is sampled with the timing of the leading edge or the trailing edge of the clock signal. In other words, the data signal only needs to assure a clear signal level with the timing of the leading edge or the trailing edge of the clock signal, and thus, the noise tolerance of the data signal is considered higher than that of the clock signal.

It is to be noted that the positional arrangement with which the twelve body connector terminals BP1 through BP12 are disposed in the holding portion 102 at the camera body 100, as shown in FIGS. 4A and 4B, is similar to the positional arrangement adopted for the twelve lens connector terminals LP1 through LP12 at the exchangeable lens 200, and for this reason, a repeated explanation is not provided. It is also to be noted that the camera body mount unit 101 adopts a mount structure widely known as a bayonet mount system, whereby it is positioned so as to face opposite the camera lens mount unit 201 and is then rotated relative to the camera lens mount unit 201 until it becomes engaged with the camera lens mount unit 201, as FIGS. 1, 4A and 4B, 5A and 5B clearly illustrate. For this reason, the body connector terminals BP1 through BP12 are disposed side-by-side along a direction opposite from the direction in which the lens connector terminals LP1 through LP12 are disposed side-by-side, as shown in FIGS. 4A and 5A. While the eleventh lens connector terminal LP11 is disposed at the left end and the first lens connector terminal LP1 is disposed at the right end in FIGS. 5A and 5B, the eleventh body connector terminal BP11 is disposed at the right end and the first body connector terminal BP1 is disposed at the left end in FIGS. 4A and 4B.

(Description of Command Data Communication)

The lens control unit 203 concurrently receives control data from the first body-side communication unit 117 and transmits response data to the first body-side communication unit 117 over predetermined first cycles (16 ms cycles in the embodiment) via the third lens connector terminal LP3, the fourth lens connector terminal LP4, the fifth lens connector terminal LP5 and the eighth lens connector terminal LP8, i.e., via the signal lines CLK, BDAT, LDAT and RDY, by controlling the first lens-side communication unit 217. The following is a detailed description of the communication carried out by the first lens-side communication unit 217 and the first body-side communication unit 117.

It is to be noted that in the description of the embodiment, the communication carried out by the first lens-side communication unit 217 and the first body-side communication unit 117, respectively under control executed by the lens control unit 203 and the body control unit 103, will be referred to as "command data communication".

Figure 6:
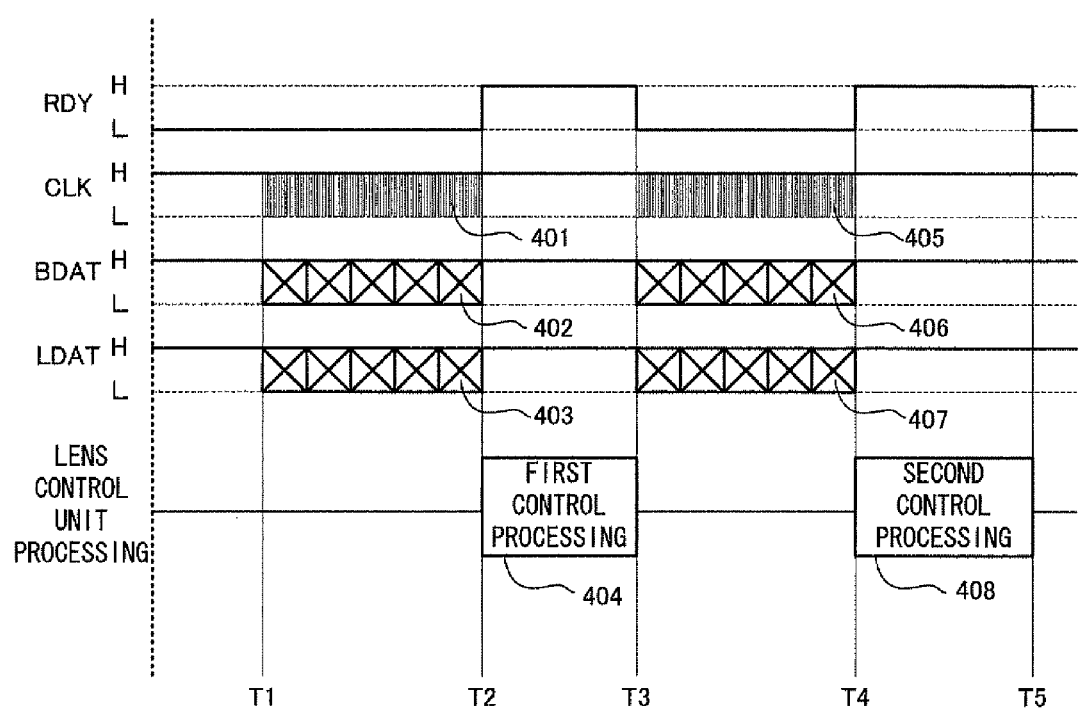
FIG. 6 is a timing chart indicating the timing with which command data communication may be executed.

FIG. 6 is a timing chart indicating the timing with which command data communication may be executed. The body control unit 103 and the first body-side communication unit 117 verify the signal level at the signal line RDY at a command data communication start (T1). The signal level at the signal line RDY indicates whether or not the first lens-side communication unit 217 is in a communication enabled state. If the first lens-side communication unit 217 is in a communication disabled state, the lens control unit 203 and the first lens-side communication unit 217 output an H (high) level signal through the eighth lens connector terminal LP8. In other words, the signal level at the signal line RDY is set to H. Until the signal line RDY holding H level shifts to L level, the body control unit 103 and the first body-side communication unit 117 do not start communication. They do not execute the next phase of processing for any communication in progress, either.

Upon verifying that the signal level at the signal line RDY is L (low) level, the body control unit 103 and the first body-side communication unit 117 output a clock signal 401 through the third body connector terminal BP3. Namely, the clock signal 401 is transmitted to the first lens-side communication unit 217 through the signal line CLK. In synchronization with the clock signal 401, the body control unit 103 and the first body-side communication unit 117 output a body-side command packet signal 402, which constitutes the first half of control data, via the fourth body connector terminal BP4. Namely, the body-side command packet signal 402 is transmitted to the first lens-side communication unit 217 via the signal line BDAT.

In addition, in synchronization with the clock signal 401 output to the signal line CLK, the lens control unit 203 and the first lens-side communication unit 217 output a lens-side command packet signal 403, which constitutes the first half of response data, via the fifth lens connector terminal LP5. Namely, the lens-side command packet signal 403 is transmitted to the first body-side communication unit 117 via the signal line LDAT.

Upon completion of the transmission of the lens-side command packet signal 403, the lens control unit 203 and the first lens-side communication unit 217 set the signal level at the signal line RDY to H (T2). The lens control unit 203 then starts first control processing 404 (which will be described later) corresponding to the contents of the body-side command packet signal 402 having been received.

Upon completing the first control processing 404, the lens control unit 203 notifies the first lens-side communication unit 217 of the completion of the first control processing 404. In response to this notification, the first lens-side communication unit 217 outputs an L-level signal via the eighth lens connector terminal LP8. In other words, the signal level at the signal line RDY is set to L (T3). In response to the signal level shift, the body control unit 103 and the first body-side communication unit 117 output a clock signal 405 through the third body connector terminal BP3. Namely, the clock signal 405 is transmitted to the first lens-side communication unit 217 via the signal line CLK.

In synchronization with the clock signal 405, the body control unit 103 and the first body-side communication unit 117 output a body-side data packet signal 406, which constitutes the second half of the control data, via the fourth body connector terminal BP4. Namely, the body-side data packet signal 406 is transmitted to the first lens-side communication unit 217 via the signal line BDAT.

In addition, in synchronization with the clock signal 405 output to the signal line CLK, the lens control unit 203 and the first lens-side communication unit 217 output a lens-side data packet signal 407, which constitutes the second half of the response data, via the fifth lens connector terminal LP5. Namely, the lens-side data packet signal 407 is transmitted to the first body-side communication unit 117 via the signal line LDAT.

Upon completion of the transmission of the lens-side data packet signal 407, the lens control unit 203 and the first lens-side communication unit 217 set the signal level at the signal line RDY to H again (T4). The lens control unit 203 then starts second control processing 408 (which will be described later) corresponding to the contents of the body-side data packet signal 406 having been received.

The first control processing 404 and the second control processing 408 executed by the lens control unit 203 are described next.

The body-side command packet signal 402 having been received may be a request for specific data available on the exchangeable lens side. In such a case, the lens control unit 203 analyzes the contents of the command packet signal 402 and generates the requested specific data through the first control processing 404. Furthermore, as part of the first control processing 404, the lens control unit 203 executes abridged communication error check processing based upon the number of data bytes so as to determine whether or not there has been any error in the communication of the command packet signal 402 by using checksum data contained in the command packet signal 402. A signal carrying the specific data generated through the first control processing 404 is output as the lens-side data packet signal 407 to the body side. It is to be noted that the body-side data packet signal 406 output from the body side following the initial output of the command packet signal 402 in this situation is a dummy data signal (still containing checksum data) which does not carry any significance to the lens side. Under these circumstances, the lens control unit 203 executes communication error check processing, such as that described above, by using the checksum data contained in the body-side data packet signal 406 as the second control processing 408.

In another scenario, the body-side command packet signal 402 may be a drive instruction for driving a lens-side drive target member. For instance, the command packet signal 402 may be a drive instruction for the focusing lens 210b and the body-side data packet signal 406 may indicate a drive quantity, i.e., the extent to which the focusing lens 210b needs to be driven. In this case, the lens control unit 203 analyzes the contents of the command packet signal 402 and generates an OK signal acknowledging that the contents have been understood in the first control processing 404. Furthermore, as part of the first control processing 404, the lens control unit 203 executes communication error check processing as described above by using the checksum data carried in the command packet signal 402. The OK signal generated through the first control processing 404 is then output to the body side as the lens-side data packet signal 407. In addition, the lens control unit 203 analyzes the contents of the body-side data packet signal 406 and executes communication error check processing, such as that described above, by using the checksum data contained in the body-side data packet signal 406 in the second control processing 408.

Upon completing the second control processing 408, the lens control unit 203 notifies the first lens-side communication unit 217 of the completion of the second control processing 408. By issuing this notification, the lens control unit 203 prompts the first lens-side communication unit 217 to output an L-level signal through the eighth lens connector terminal LP8. Namely, the signal level at the signal line RDY is set to L (T5).

It is to be noted that if the body-side command packet signal 402 is an instruction for driving a lens-side drive target member (e.g., the focusing lens) as described above, the lens control unit 203 engages the lens drive unit 212 in execution of processing through which the focusing lens 210b is driven by the extent matching the drive quantity, while sustaining the signal level at the signal line RDY at L level via the first lens-side communication unit 217.

The communication carried out from the time point T1 through the time point T5 as described above constitutes a single command data communication session. Through the single session of command data communication executed as described above, one body-side command packet signal 402 and one body-side data packet signal 406 are transmitted by the body control unit 103 and the first body-side communication unit 117. Namely, while the processing requires two separate packet signals to be transmitted, the two separate packet signals, i.e., the body-side command packet signal 402 and the body-side data packet signal 406, together constitute a set of control data.

Likewise, one lens-side command packet signal 403 and one lens-side data packet signal 407 are transmitted by the lens control unit 203 and the first lens-side communication unit 217 through the single session of command data communication. Namely, the two separate packet signals, i.e., the lens-side command packet signal 403 and the lens-side data packet signal 407, together constitute a set of response data.

As described above, the lens control unit 203 and the first lens-side communication unit 217 receive the control data from the first body-side communication unit 117 and concurrently transmit the response data to the first body-side communication unit 117. The eighth lens connector terminal LP8 and the eighth body connector terminal BP8 used for command data communication are contact points via which an asynchronous signal (a signal indicating H (high) level or L (low) level read at the signal line RDY) that is not synchronous with any clock signal is transmitted.

(Description of Hotline Communication)

The lens control unit 203 transmits lens position data to the second body-side communication unit 118 via the ninth lens connector terminal LP9, the tenth lens connector terminal LP10, the sixth lens connector terminal LP6 and the seventh lens connector terminal LP7, i.e., via the signal lines HREQ, HANS, HCLK and HDAT, by controlling the second lens-side communication unit 218. The following is a detailed description of the communication carried out by the second lens-side communication unit 218 and the second body-side communication unit 118.

It is to be noted that in the description of the embodiment, the communication carried out by the second lens-side communication unit 218 and the second body-side communication unit 118, respectively under control executed by the lens control unit 203 and the body control unit 103, will be referred to as "hotline communication".

Figure 7A:
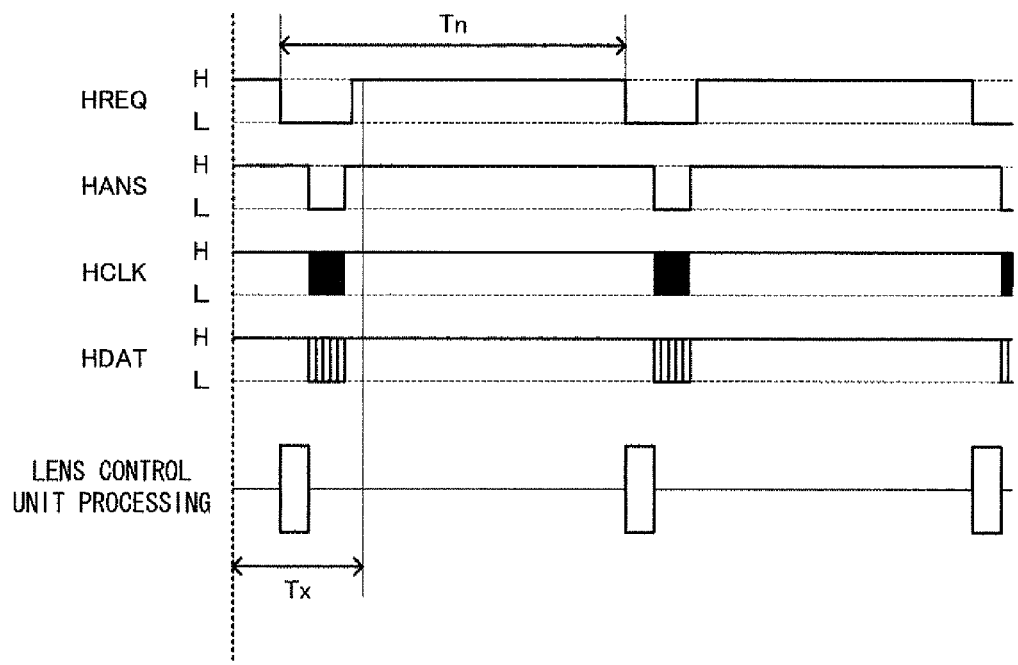
FIGS. 7A and 7B are timing charts indicating the timing with which hotline communication may be executed.
Figure 7B:
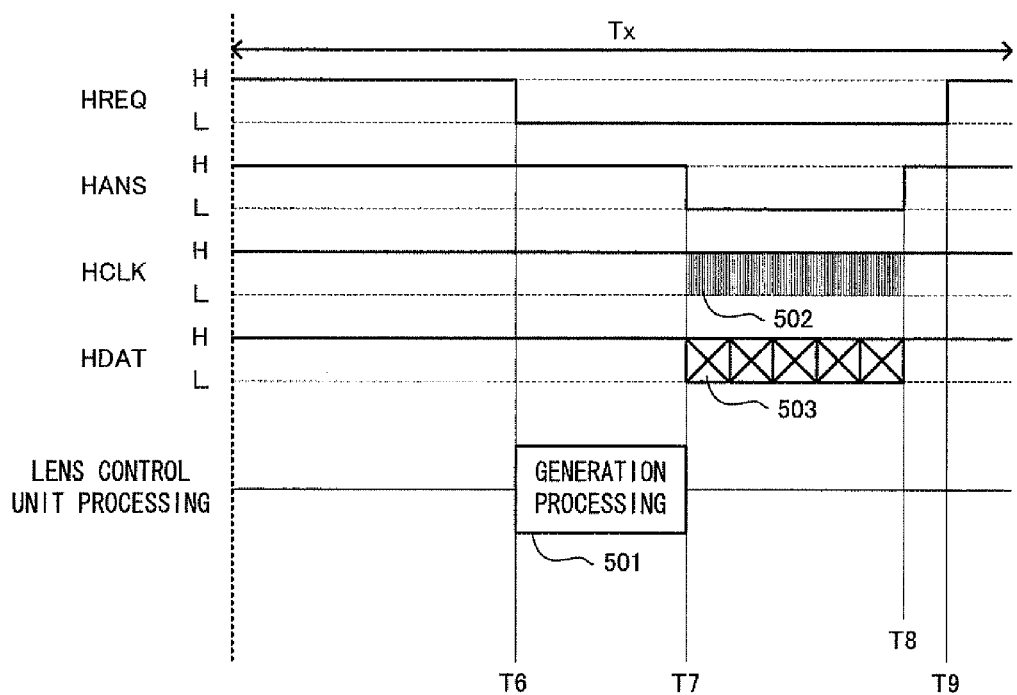

FIGS. 7A and 7B are timing charts indicating the timing with which hotline communication may be executed. The body control unit 103 in the embodiment adopts a structure that allows it to start hotline communication over predetermined second cycles (1 ms cycles in the embodiment). These cycles are shorter than the cycles over which command data communication is executed. FIG. 7A indicates that hotline communication is repeatedly executed over predetermined cycles Tn. FIG. 7B is an enlarged view of a given communication period Tx elapsing as hotline communication is repeatedly executed. The following is a description of the procedure through which hotline communication is carried out, given in reference to the timing chart in FIG. 7B.

The body control unit 103 and the second body-side communication unit 118 first output an L-level signal through the ninth body connector terminal BP9 at a hotline communication start (T6). In other words, the signal level at the signal line HREQ is set to L. The second lens-side communication unit 218 notifies the lens control unit 203 that the signal has been input to the ninth lens connector terminal LP9. In response to this notification, the lens control unit 203 starts executing data generation processing 501 in order to generate lens position data. In the generation processing 501, the lens control unit 203 engages the lens position detection unit 213 in detection of the position of the focusing lens 210b and generates lens position data indicating the detection results.

Once the lens control unit 203 completes execution of the generation processing 501, the lens control unit 203 and the second lens-side communication unit 218 output an L-level signal through the tenth lens connector terminal LP10 (T7). In other words, the signal level at the signal line HANS is set to L. In response to input of this signal at the tenth body connector terminal BP10, the body control unit 103 and the second body-side communication unit 118 output a clock signal 502 via the sixth body connector terminal BP6. Namely, the clock signal is transmitted to the second lens-side communication unit 218 via the signal line HCLK.

In synchronization with the clock signal 502, the lens control unit 203 and the second lens-side communication unit 218 output a lens position data signal 503 carrying the lens position data through the seventh lens connector terminal LP7. In other words, the lens position data signal 503 is transmitted to the second body-side communication unit 118 via the signal line HDAT.

Upon completing the transmission of the lens position data signal 503, the lens control unit 203 and the second lens-side communication unit 218 output an H-level signal through the tenth lens connector terminal LP10. In other words, the signal level at the signal line HANS is set to H (T8). In response to input of this signal at the tenth body connector terminal BP10, the second body-side communication unit 118 outputs an H-level signal through the ninth body connector terminal BP9. In other words, the signal level at the signal line HREQ is set to H (T9).

The communication carried out from the time point T6 through the time point T9 as described above constitutes a single hotline communication session. Through the single session of hotline communication executed as described above, a single lens position data signal 503 is transmitted by the lens control unit 203 and the second lens-side communication unit 218. The ninth lens connector terminal LP9, the tenth lens connector terminal LP10, the ninth body connector terminal BP9 and the tenth body connector terminal BP10 used in hotline communication are contact points via which asynchronous signals that are not synchronous with any clock signal are transmitted. In other words, the ninth lens connector terminal LP9 and the ninth body connector terminal BP9 are contact points via which an asynchronous signal (indicating H (high) level or L (low) level read at the signal line HREQ) is transmitted, whereas the tenth lens connector terminal LP10 and the tenth body connector terminal BP10 are terminals via which an asynchronous signal (indicating H (high) level or L (low) level read at the signal line HANS) is transmitted.

It is to be noted that command data communication and hotline communication may be executed simultaneously or they may be executed partially concurrently. This means that even while one of the communication units, i.e., either the first lens-side communication unit 217 or the second lens-side communication unit 218, is engaged in communication with the camera body 100, the other communication unit is also allowed to communicate with the camera body 100.

The camera system achieved in the first embodiment as described above realizes the following advantages.

(1) The holding portion 202 is configured so that the distance between the mount center point O and the centers of six lens connector terminals LP2, LP3, LP5, LP9, LP6 and LP11 (i.e., the centers of their exposed areas), among the twelve lens connector terminals LP1 through LP12 (among the exposed areas of the twelve lens connector terminals), is different from the distance between the mount center point O and the centers of the remaining six lens connector terminals LP1, LP4, LP8, LP10, LP7 and LP12 (i.e., the centers of their exposed areas). In more specific terms, the twelve lens connector terminals LP1 through LP12 (the twelve exposed areas) are disposed at the holding portion 202 in a staggered pattern so as to achieve varying distances between the mount center point O and the lens connector terminals. By adopting this positional arrangement, a lens that allows even a terminal at an offset position to come into contact with a body connector terminal is provided. Furthermore, since a specific positional pattern is formed at the mount surface, the individual terminals can be identified with better ease. Moreover, since the lens connector terminals can assume a shape and a positional arrangement different from those of the body connector terminals, the lens connector terminals can be disposed with a higher degree of freedom.

Second Embodiment

While the camera system achieved in the second embodiment of the present invention has a structure similar to that of the camera system in the first embodiment, a positional arrangement different from that in the first embodiment is adopted for the lens connector terminals in the second embodiment. The following is a description of the positional arrangement with which the lens connector terminals are disposed in the second embodiment. It is to be noted that in the following description, the same reference numerals are assigned to components similar to those of the first embodiment so as to preclude the necessity for a repeated explanation thereof. In addition, it is assumed that the camera body is identical to that in the first embodiment.

Figure 8:
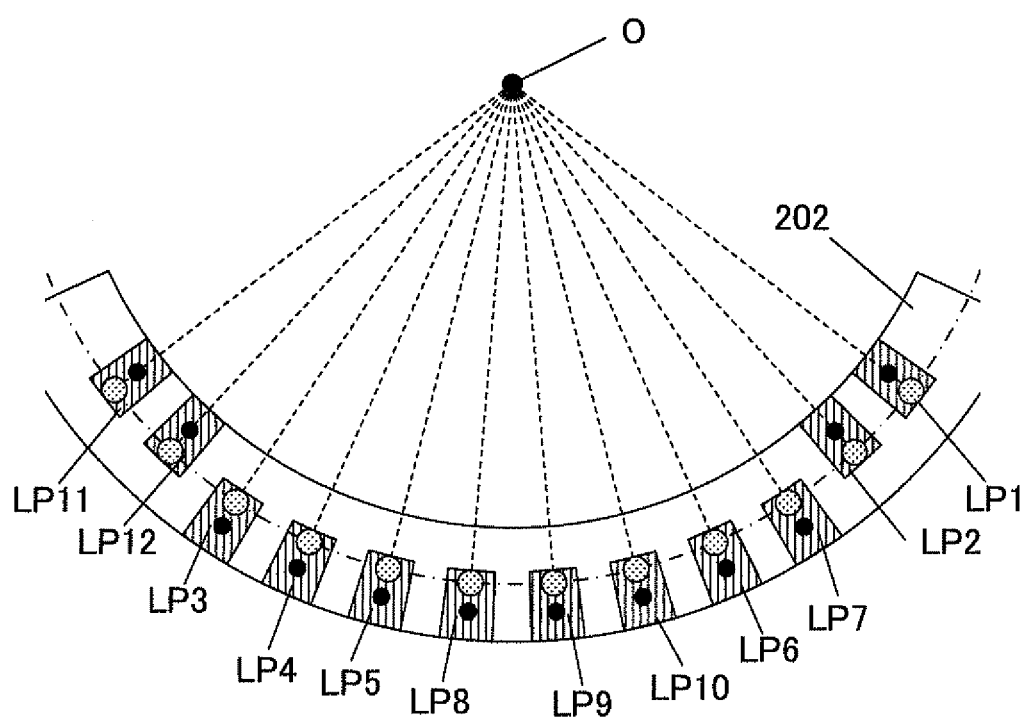
FIG. 8 shows a holding portion achieved in a second embodiment in a front view.

FIG. 8 is a front view of the holding portion 202 achieved in the second embodiment. Twelve lens connector terminals LP1 through LP12 (their exposed areas) are disposed in the holding portion 202 of the camera lens mount unit 201 in this embodiment by adopting a positional arrangement different from that in the first embodiment. More specifically, among the twelve lens connector terminals LP1 through LP12 (among the twelve exposed areas), the first lens connector terminal LP1, the second lens connector terminal LP2, the eleventh lens connector terminal LP11 and the twelfth lens connector terminal LP12 are disposed further toward the inner circumferential side of the holding portion 202 (i.e., the side closer to the mount center point O) and the remaining eight lens connector terminals LP3 through LP10 are disposed further toward the outer circumferential side of the holding portion 202 (i.e., the side further away from the mount center point O). In other words, the twelve lens connector terminals LP1 through LP12 (their exposed areas) are disposed so that the distance between the mount center point O and the centers of four lens connector terminals (their exposed areas) is different from the distance between the mount center point O and the centers of the other eight lens connector terminals (their exposed areas).

The camera system achieved in the second embodiment as described above realizes the following advantage.

(1) The holding portion is configured by setting the distance by which the centers of the first lens connector terminal LP1, the second lens connector terminal LP2, the eleventh lens connector terminal LP11 and the twelfth lens connector terminal LP12 (the centers of their exposed areas) are set apart from the mount center point O is different from the distance that sets apart the centers of the third lens connector terminal LP3 through the tenth lens connector terminal LP10 (i.e., the centers of their exposed areas) from the mount center point O. Through this positional arrangement, the distance between the power supply system terminals and the communication system terminals is lengthened to result in a reduction in noise at the communication system terminals. In addition, the power supply system terminals and the communication system terminals can be visually distinguished from each other with ease.

Third Embodiment

Figure 9:
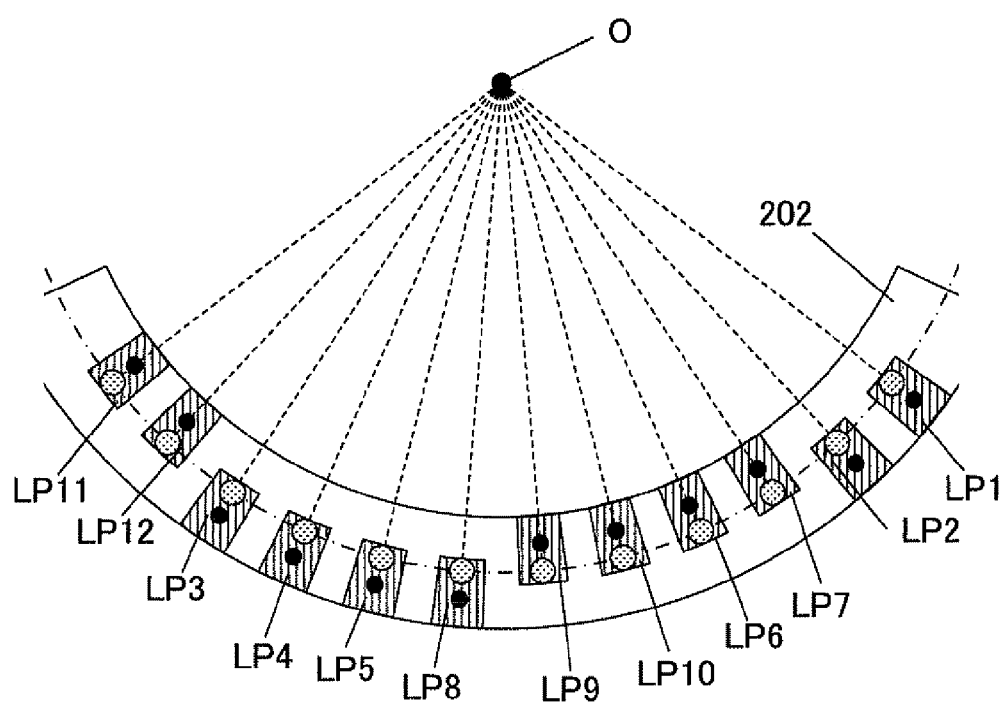
FIG. 9 shows a holding portion achieved in a third embodiment in a front view.

FIG. 9 is a front view of the holding portion 202 achieved in the third embodiment. Twelve lens connector terminals LP1 through LP12 (their exposed areas) are disposed in the holding portion 202 of the camera lens mount unit 201 in this embodiment by adopting a positional arrangement different from those in the first embodiment and the second embodiment. More specifically, among the twelve lens connector terminals LP1 through LP12 (among the twelve exposed areas), the sixth lens connector terminal LP6, the seventh lens connector terminal LP7, the ninth lens connector terminal LP9, the tenth lens connector terminal LP10, the eleventh lens connector terminal LP11 and the twelfth lens connector terminal LP12 are disposed further toward the inner circumferential side of the holding portion 202 (i.e., the side closer to the mount center point O) and the remaining six lens connector terminals LP1 through LP5 and LP8 are disposed further toward the outer circumferential side of the holding portion 202 (i.e., the side further away from the mount center point O). In other words, the twelve lens connector terminals LP1 through LP12 (their exposed areas) are disposed so that the distance between the mount center point O and the centers of six lens connector terminals (their exposed areas) is different from the distance between the mount center point O and the centers of the other six lens connector terminals (their exposed areas).

The camera system achieved in the third embodiment as described above realizes the following advantage.

(1) The holding portion is configured by setting the distance by which the centers of the third lens connector terminal LP3, the fourth lens connector terminal LP4, the fifth lens connector terminal LP5 and the eighth lens connector terminal LP8 (the centers of their exposed areas) are set apart from the mount center point O is different from the distance that sets apart the centers of the sixth lens connector terminal LP6, the seventh lens connector terminal LP7, the ninth lens connector terminal LP9 and the tenth lens connector terminal LP10 (i.e., the centers of their exposed areas) from the mount center point O. By adopting this positional arrangement, it becomes possible to visually distinguish with ease the lens connector terminals used for command data communication from the lens connector terminals used for hotline communication.

Fourth Embodiment

Figure 10:
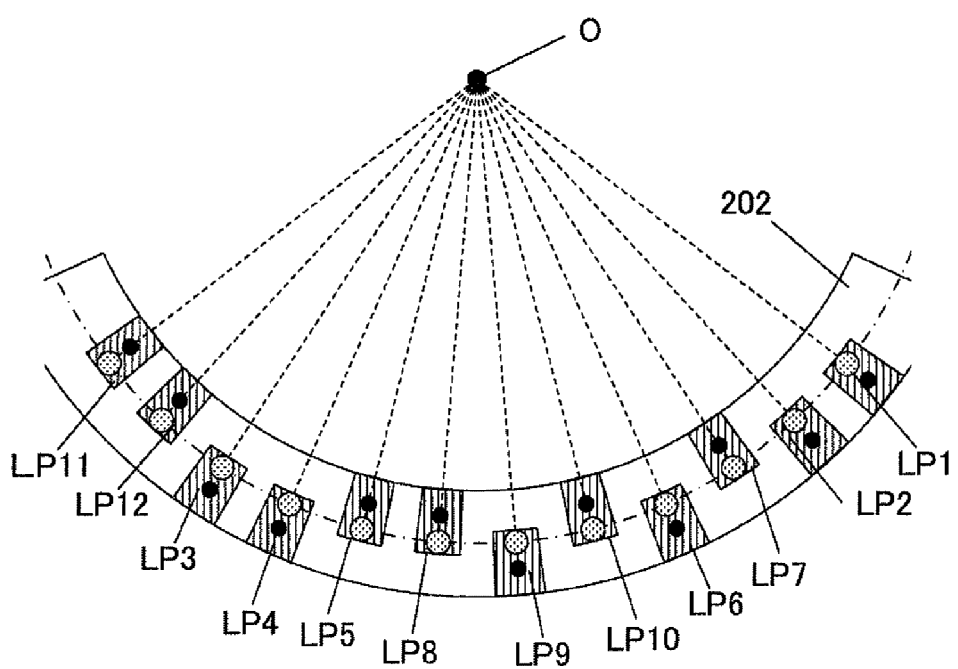
FIG. 10 shows a holding portion achieved in a fourth embodiment in a front view.

FIG. 10 is a front view of the holding portion 202 achieved in the fourth embodiment. Twelve lens connector terminals LP1 through LP12 (their exposed areas) are disposed in the holding portion 202 of the camera lens mount unit 201 in this embodiment by adopting a positional arrangement different from those in the first embodiment through third embodiment. More specifically, among the twelve lens connector terminals LP1 through LP12 (among the twelve exposed areas), the fifth lens connector terminal LP5, the seventh lens connector terminal LP7, the eighth lens connector terminal LP8, the tenth lens connector terminal LP10, the eleventh lens connector terminal LP11 and the twelfth lens connector terminal LP12 are disposed further toward the inner circumferential side of the holding portion 202 (i.e., the side closer to the mount center point O) and the remaining six lens connector terminals LP1 through LP4, LP6 and LP9 are disposed further toward the outer circumferential side of the holding portion 202 (i.e., the side further away from the mount center point O). In other words, the twelve lens connector terminals LP1 through LP12 (their exposed areas) are disposed so that the distance between the mount center point O and the centers of six lens connector terminals (their exposed areas) is different from the distance between the mount center point O and the centers of the other six lens connector terminals (their exposed areas).

The camera system achieved in the fourth embodiment as described above realizes the following advantage.

(1) The holding portion is configured by setting the distance by which the centers (of the exposed areas) of the third lens connector terminal LP3, the fourth lens connector terminal LP4, the sixth lens connector terminal LP6 and the ninth lens connector terminal LP9 are set apart from the mount center point O is different from the distance that sets apart the centers of the fifth lens connector terminal LP5, the seventh lens connector terminal LP7, the eighth lens connector terminal LP8 and the tenth lens connector terminal LP10 (i.e., the centers of their exposed areas) from the mount center point O. By adopting this positional arrangement, it becomes possible to visually distinguish with ease the lens connector terminals through which signals are output from the exchangeable lens 200 to the camera body 100, from the lens connector terminals through which signals output from the camera body 100 enter the exchangeable lens 200.

Fifth Embodiment

Figure 11:
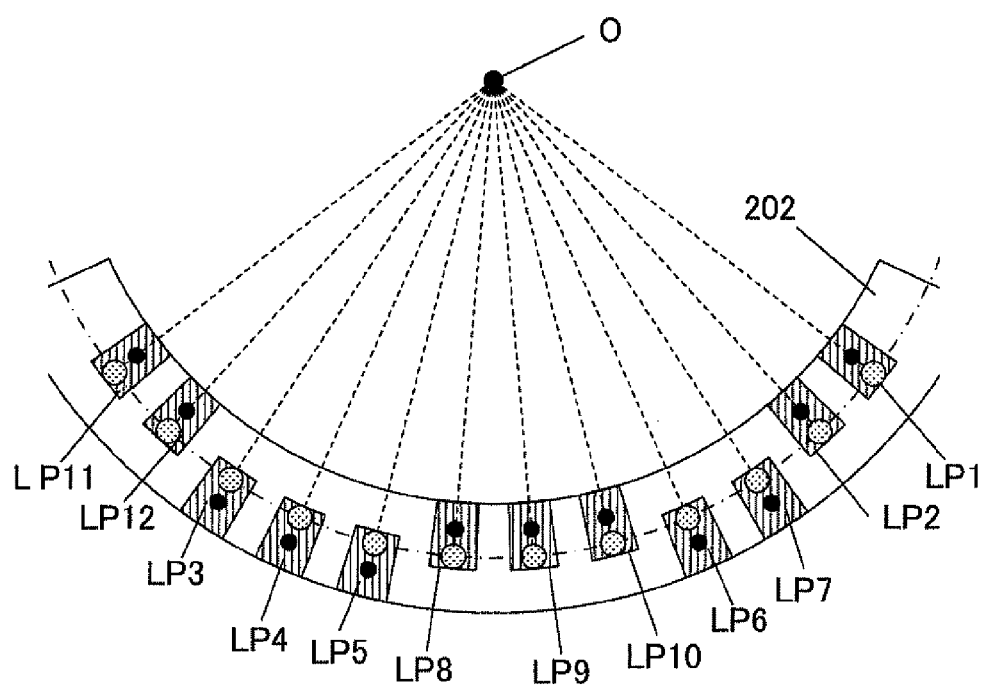
FIG. 11 shows a holding portion achieved in a fifth embodiment in a front view.

FIG. 11 is a front view of the holding portion 202 achieved in the fifth embodiment. Twelve lens connector terminals LP1 through LP12 (their exposed areas) are disposed in the holding portion 202 of the camera lens mount unit 201 in this embodiment by adopting a positional arrangement different from those in the first embodiment through fourth embodiment. More specifically, among the twelve lens connector terminals LP1 through LP12 (among the twelve exposed areas), the first lens connector terminal LP1, the second lens connector terminal LP2, the eighth lens connector terminal LP8, the ninth lens connector terminal LP9, the tenth lens connector terminal LP10, the eleventh lens connector terminal LP11 and the twelfth lens connector terminal LP12 are disposed further toward the inner circumferential side of the holding portion 202 (i.e., the side closer to the mount center point O) and the remaining five lens connector terminals LP3 through LP7 are disposed further toward the outer circumferential side of the holding portion 202 (i.e., the side further away from the mount center point O). In other words, the twelve lens connector terminals LP1 through LP12 (their exposed areas) are disposed so that the distance between the mount center point O and the centers of seven lens connector terminals (their exposed areas) is different from the distance between the mount center point O and the centers of the other five lens connector terminals (their exposed areas).

The camera system achieved in the fifth embodiment as described above realizes the following advantage.

(1) The holding portion is configured by setting the distance by which the centers (of the exposed areas) of the third lens connector terminal LP3, the fourth lens connector terminal LP4, the fifth lens connector terminal LP5, the sixth lens connector terminal LP6 and the seventh lens connector terminal LP7 (the centers of their exposed areas) are set apart from the mount center point O is different from the distance that sets apart the centers of the eighth lens connector terminal LP8, the ninth lens connector terminal LP9 and the tenth lens connector terminal LP10 (i.e., the centers of their exposed areas) from the mount center point O. By adopting this positional arrangement, the adverse effect of noise originating from the lens connector terminals through which high-frequency signals pass, on the other lens connector terminals can be reduced. In addition, the lens connector terminals through which high-frequency signals pass can be visually distinguished with better ease from the other lens connector terminals.

Sixth Embodiment

Figure 12A:
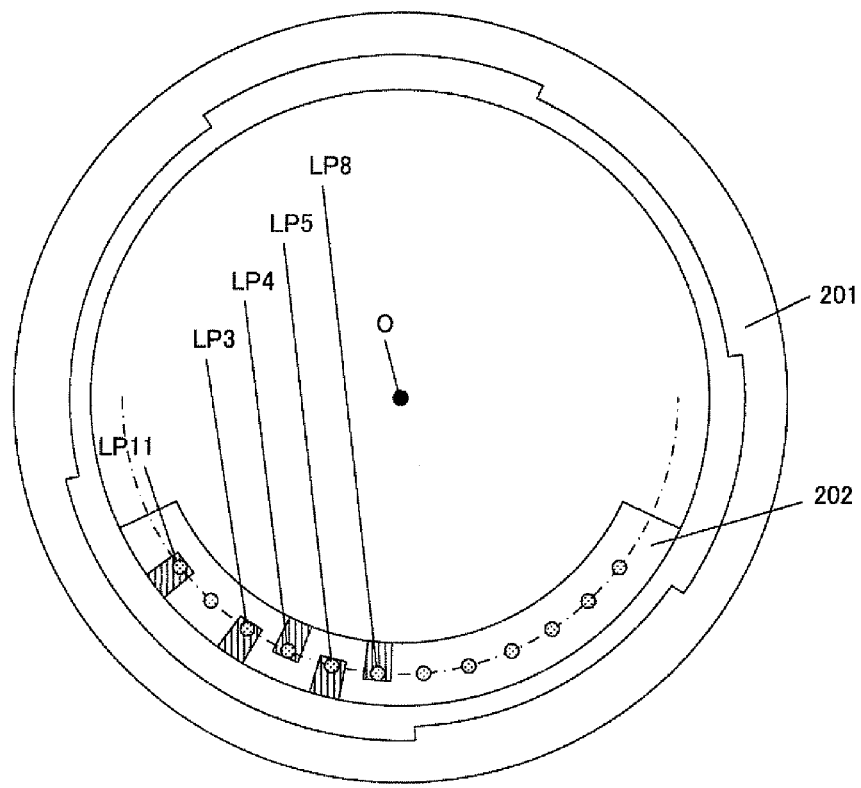
FIGS. 12A and 12B respectively provide a front view and an enlarged view of a holding portion achieved in a sixth embodiment.
Figure 12B:
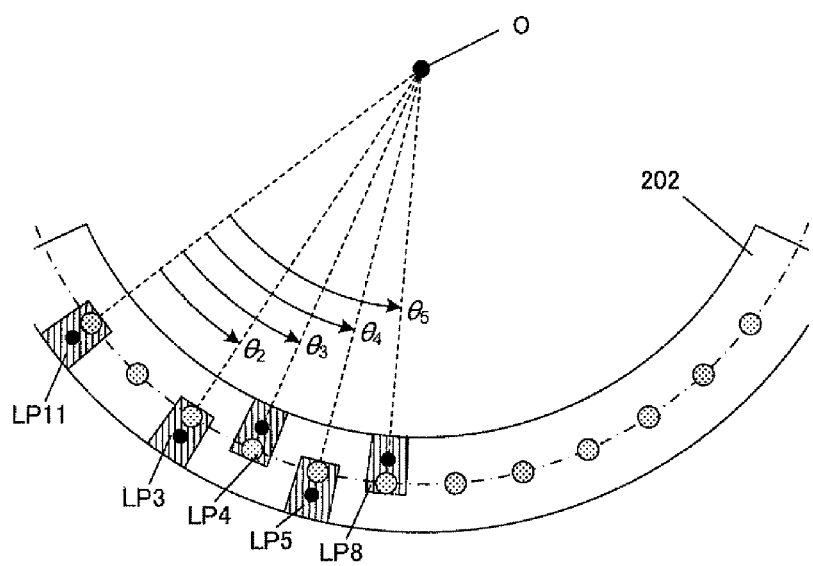

FIGS. 12A and 12B show the holding portion 202 achieved in the sixth embodiment in front views. Five lens connector terminals LP3, LP4, LP5, LP8 and LP11 are disposed in the holding portion 202 at the camera lens mount unit 201 in the embodiment. As FIGS. 12A and 12B clearly indicate, fewer lens connector terminals are disposed in the holding portion 202 compared to the first through fifth embodiments. In more specific terms, the first lens connector terminal LP1, through which the drive voltage for the lens drive unit 212 is provided, the second lens connector terminal LP2, functioning as a ground terminal for the first lens connector terminal LP1, and the twelfth lens connector terminal LP12 functioning as a ground terminal corresponding to operating voltage provided to various units other than the lens drive unit 212, as well as the lens connector terminals LP6, LP7, LP9 and LP10 used in hotline communication in the previous embodiments, are absent in the holding portion 202 in the embodiment. These connector terminals are not included in the holding portion 202 for the following reason.

The exchangeable lens 200 in this embodiment is a manual focusing lens that does not have an autofocus function. In other words, the exchangeable lens 200 in the embodiment is not equipped with a lens drive unit 212. This means that the system in the embodiment does not require the first lens connector terminal LP1, through which the drive voltage for the lens drive unit 212 is provided in the previous embodiments, and the second lens connector terminal LP2 functioning as the ground terminal for the first lens connector terminal LP1, i.e., these lens connector terminals do not need to be disposed in the holding portion 202. In addition, unless an autofocus function is engaged, there is no need to transmit information indicating the position of the focusing lens 210b to the camera body 100 through hotline communication and thus there is no need for the exchangeable lens to include the communication system terminals for hotline communication. Namely, the communication system terminals for hotline communication, i.e., the ninth lens connector terminal LP9, the tenth lens connector terminal LP10, the sixth lens connector terminal LP6 and the seventh lens connector terminal LP7 do not need to be disposed in the holding portion 202. Furthermore, the twelfth lens connector terminal LP12, the function of which can be fulfilled by the second lens connector terminal LP2, would be redundant. It is to be noted that if an exchangeable lens 200 without any ground terminal, i.e., an exchangeable lens 200 with neither the second lens connector terminal LP2 nor the twelfth lens connector terminal LP12 disposed thereat, is mounted at (engaged with) the camera body 100, an area of the exchangeable lens 200 that contacts the camera body 100 should be substituted for a ground terminal. For instance, the camera lens mount unit 201 may be utilized as a ground terminal. In addition, if either the second lens connector terminal LP2 or the twelfth lens connector terminal LP12 does not exist, another lens connector terminal, i.e., a lens connector terminal disposed at the exchangeable lens 200, may serve as a ground terminal.

Among the five lens connector terminals LP3, LP4, LP5, LP8 and LP11 (their exposed areas), the fourth lens connector terminal LP4 and the eighth lens connector terminal LP8 are disposed further toward the inner circumferential side of the holding portion 202 (i.e., the side closer to the mount center point O) and the remaining three lens connector terminals LP3, LP5 and LP11 are disposed further toward the outer circumferential side of the holding portion 202 (i.e., the side further away from the mount center point O). In other words, the five lens connector terminals LP3, LP4, LP5, LP8 and LP11 (their exposed areas) are disposed so that the distance between the mount center point O and the centers of two lens connector terminals (their exposed areas) is different from the distance between the mount center point O and the centers of the other three lens connector terminals (their exposed areas).

It is to be noted that the five lens connector terminals LP3, LP4, LP5, LP8 and LP11 are disposed so as to achieve a specific positional relationship and that the contact areas of the lens connector terminals LP3, LP4, LP5 and LP8 and the contact area of the eleventh lens connector terminal form interior angles θ2, θ3, θ4 and θ5 at the mount center point O, exactly as has been explained in reference to FIGS. 5A and 5B pertaining to the first embodiment.

The camera system achieved in the sixth embodiment as described above realizes advantages similar to those of the first embodiment.

Seventh Embodiment

The camera system achieved in the seventh embodiment of the present invention having a configuration similar to that of the camera system in the first embodiment includes lens connector terminals with a profile (at their exposed areas) different from the profile of the lens connector terminals in the first embodiment. The following is a description of the profile of the lens connector terminals (at their exposed areas) in the seventh embodiment. It is to be noted that since the lens connector terminals are disposed with a positional arrangement similar to that in the first embodiment, a repeated explanation is not provided. In short, twelve lens connector terminals are disposed at the holding portion 202, as has been described in reference to FIGS. 5A and 5B.

Figure 13:
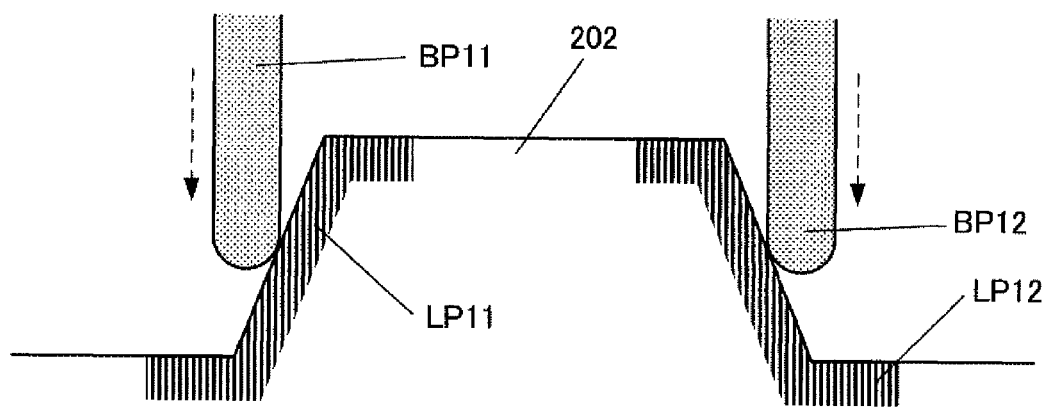
FIG. 13 shows a holding portion achieved in a seventh embodiment in a sectional view taken at a position indicated by the one-point chain line in FIG. 5.

FIG. 13 is a sectional view of the holding portion 202 in the seventh embodiment, taken at a position indicated by the one-point chain line in FIGS. 5A and 5B. It is to be noted that FIG. 13 shows an area around the eleventh lens connector terminal LP11 (its exposed area) disposed at the left end of the holding portion 202 and the twelfth lens connector terminal LP12 (its exposed area) and does not include an illustration of the other lens connector terminals. It is assumed that the other lens connector terminals, too, assume profiles similar to those of the eleventh lens connector terminal LP11 (the profile of its exposed area) and the twelfth lens connector terminal LP12 (the profile of its exposed area) shown in FIG. 13.

As FIG. 13 indicates, the parts of the holding portion 202 in this embodiment that correspond to the contact positions at which it comes into contact with the body connector terminals BP1 through BP12, are made to slope relative to the direction along which force is imparted to the body connector terminals BP1 through BP12 (the direction indicated by the arrows in FIG. 13). In this embodiment, the contact areas of the lens connector terminals LP1 through LP12 include sloping portions that incline relative to the direction along which the body connector terminals BP1 through BP12 come into contact with the contact areas of the lens connector terminals LP1 through LP12. The lens connector terminals LP1 through LP12 achieve contact with the body connector terminals BP1 through BP12 over the sloping portions.

In addition, the sloping portions of the lens connector terminals disposed closer to the inner circumferential side (e.g., the side closer to the mount center point O) of the holding portion 202 (the twelfth lens connector terminal LP12 and the like) are made to incline along a direction different from the direction in which the sloping portions of the lens connector terminals disposed toward the outer circumferential side (the side further away from the mount center point O) of the holding portion 202 (e.g., the eleventh lens connector terminal LP11 and the like) are made to incline. In more specific terms, the sloping portions of the former lens connector terminals are made to incline so that the left side assumes a greater height relative to the height of the right side, viewed from the bottom of FIG. 5, whereas the sloping portions of the latter lens connector terminals are made to incline along the opposite direction.

It is to be noted that while all the lens connector terminals LP1 through LP12 each include a sloping portion in the embodiment, it is not essential that the lens connector terminals LP1 through LP12 each include a sloping portion. For instance, only the first lens connector terminal LP1 may include a sloping portion, or the first lens connector terminal LP1 and the eleventh lens connector terminal LP11 alone may include sloping portions.

The following advantage is achieved through the camera system in the seventh embodiment described above.

(1) The contact areas of the twelve lens connector terminals LP1 through LP12 each include a sloping portion and the lens connector terminals LP1 through LP12 come into contact with the body connector terminals BP1 through BP12 at their sloping portions. Through these measures, the individual terminals are connected with better reliability so as to sustain better connectivity.

Eighth Embodiment

The camera system achieved in the eighth embodiment of the present invention having a configuration similar to that of the camera system in the first embodiment includes lens connector terminals with their exposed areas assuming a profile different from the profile of the lens connector terminals in the first embodiment. The following is a description of the profile of the lens connector terminals at their exposed areas as achieved in the eighth embodiment. It is to be noted that in the following description, the same reference numerals are assigned to components similar to those of the first embodiment so as to preclude the necessity for a repeated explanation thereof. In addition, it is assumed that the camera body is identical to that in the first embodiment.

Figure 14A:
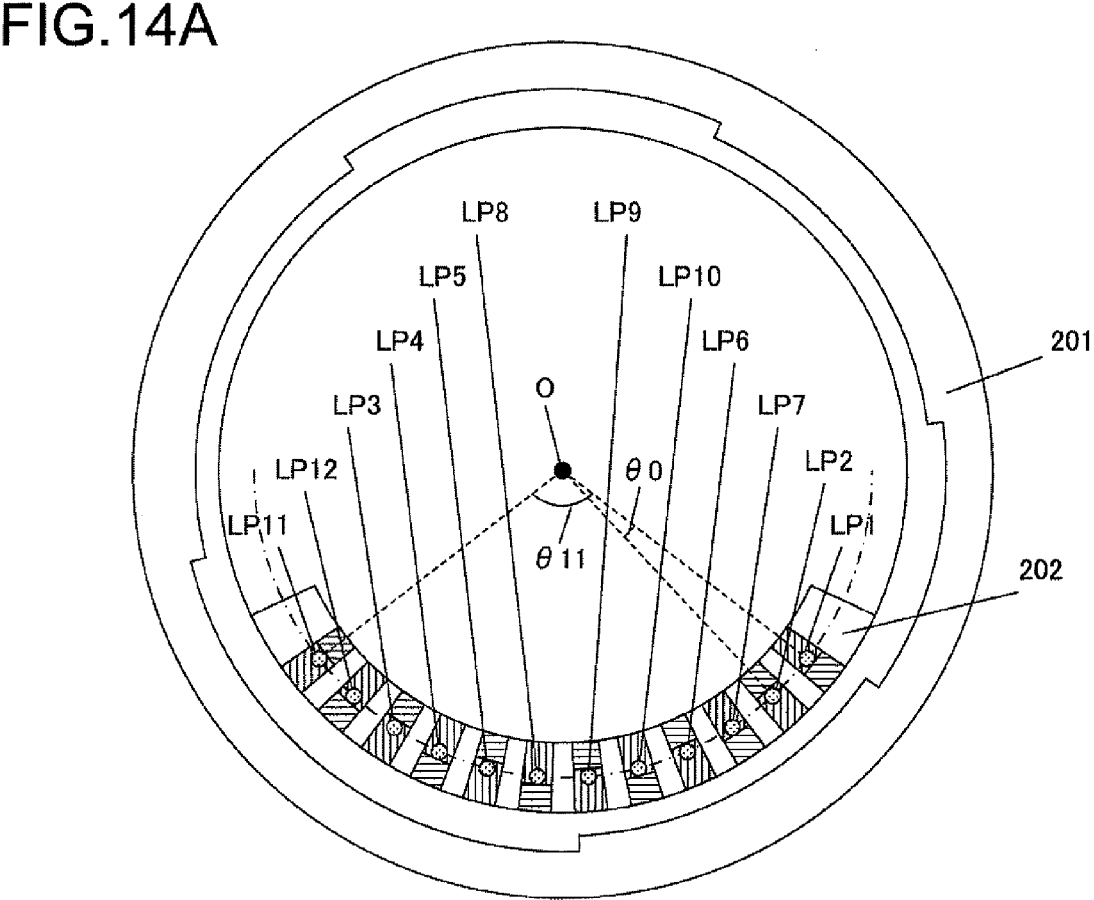
FIGS. 14A and 14B respectively provide a front view and an enlarged view of a holding portion achieved in an eighth embodiment.
Figure 14B:
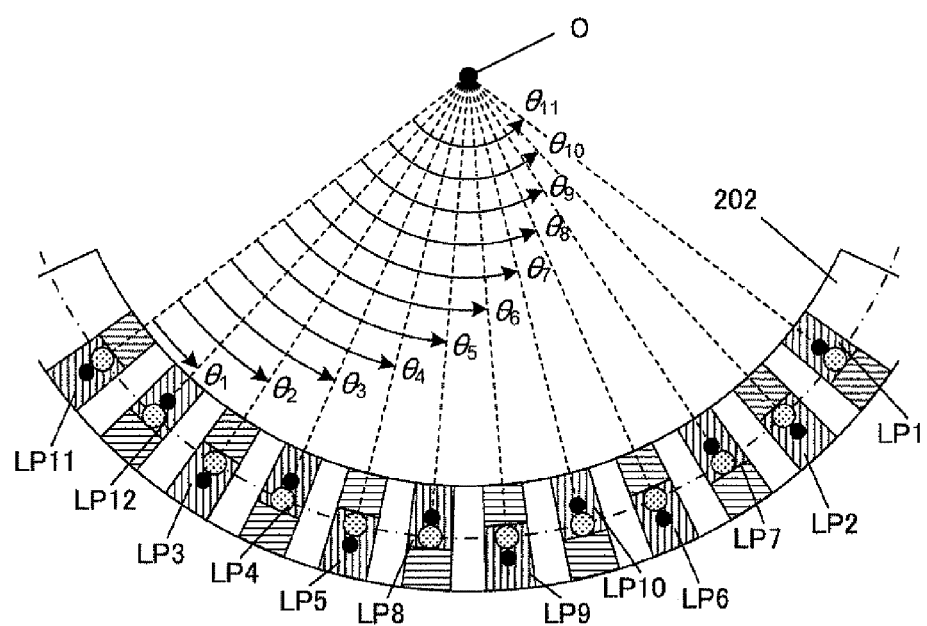

FIGS. 14A and 14B show the holding portion 202 achieved in the eighth embodiment in front views. As FIGS. 14A and 14B indicate, twelve lens connector terminals LP1 through LP12 disposed in the holding portion 202 at the camera lens mount unit 201 in the embodiment each assume a size large enough to range from the inner circumferential side (the side closer to the mount center point O) of the holding portion 202 through the outer circumferential side (the side further away from the mount center point O) of the holding portion 202. However, the size of their exposed areas and the positions of the exposed areas are the same as those of the lens connector terminals in the first embodiment described in reference to FIGS. 5A and 5B. The following is a description of features unique to the eighth embodiment, given in reference to a sectional view of the eighth lens connector terminal LP8.

Figure 15A:
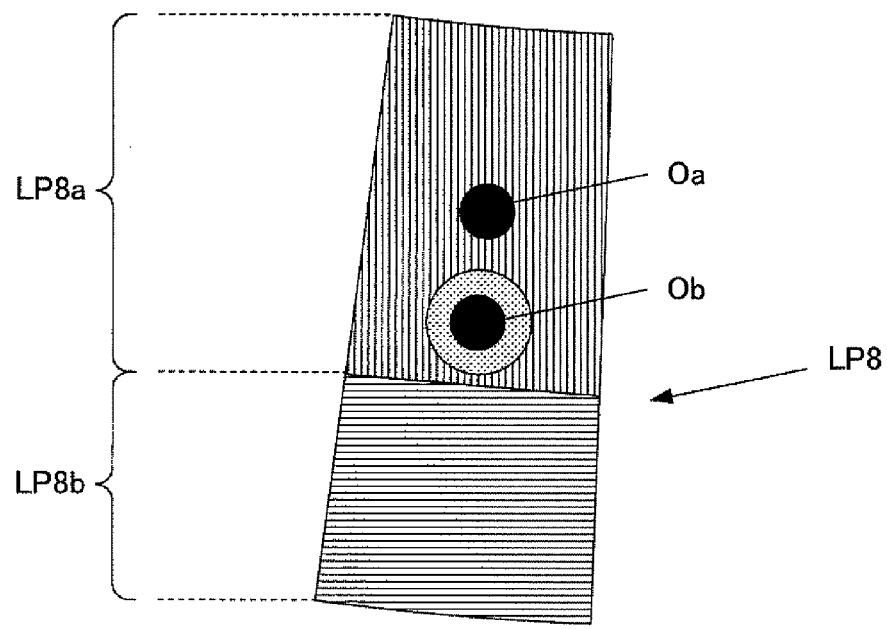
FIGS. 15A and 15B respectively provide a front view and a sectional view of the eighth lens connector terminal achieved in the eighth embodiment.
Figure 15B:
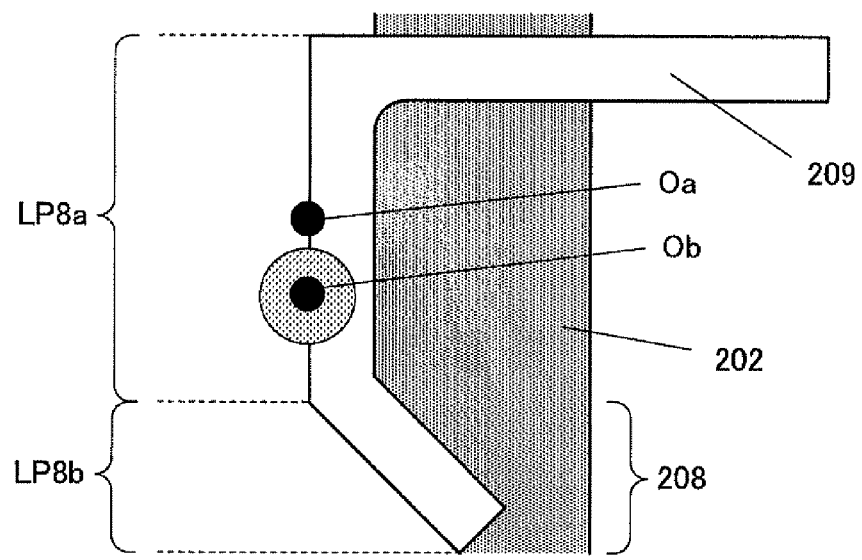

FIG. 15A is an enlarged front view of the eighth lens connector terminal LP8, whereas FIG. 15B shows the eighth lens connector terminal LP8 and the holding portion 202 in a sectional view. As shown in the sectional view presented in FIG. 15B, one end of a metal piece 209 constituting the eighth lens connector terminal LP8 is placed in a recess 208 formed at the surface of the holding portion 202. Namely, the surface of the metal piece 209 includes two different areas, i.e., an exposed area LP8a, which is exposed at the surface of the holding portion 202, and a fixing part LP8b at which the metal piece 209 is fixed to the holding portion 202. While the exposed area, viewed from the surface as in FIG. 15A, appears to be larger than those shown in FIGS. 5A and 5B, the size of the exposed area LP8a is actually the same as that of the exposed areas in FIGS. 5A and 5B. This means that the eighth lens connector terminal LP8 in the embodiment centers on a central point Oa of its exposed area, instead of a central point Ob of the entire range, which includes the fixing part LP8b.

While a repeated explanation is not provided, the exposed areas of the remaining eleven lens connector terminals are identical to the exposed area of the eighth lens connector terminal LP8 described above. Namely, the size of the exposed areas and the positions of the exposed areas of the remaining eleven lens connector terminals are the same as those of the lens connector terminals shown in FIGS. 5A and 5B, and the area that would appear to have been added on at the surface is accounted for by the fixing part at which each metal piece is fixed to the holding portion 202. In addition, while the explanation is given above by assuming that the sizes and the positions of the exposed areas are the same as those in the first embodiment described in reference to FIGS. 5A and 5B, exposed areas may be formed to range over sizes and at positions different from those in the first embodiment.

The camera system achieved in the eighth embodiment as described above realizes advantages similar to those of the first embodiment.

The present invention allows for the following variations and one of the variations or a plurality of variations may be adopted in combination with any of the embodiments described above.

(Variation 1)

In the embodiments described above, the plurality of lens connector terminals are disposed along the upper edge and the lower edge of the holding portion 202, as illustrated in FIGS. 5A and 5B. However, the present invention is not limited to this example and the plurality of lens connector terminals may be disposed in the holding portion 202 by adopting a different positional arrangement. In addition, the plurality of lens connector terminals may be disposed at any positions within the holding portion 202 and the holding portion 202 may adopt any shape that may be different from the shape shown in FIGS. 5A and 5B.

Figure 16:
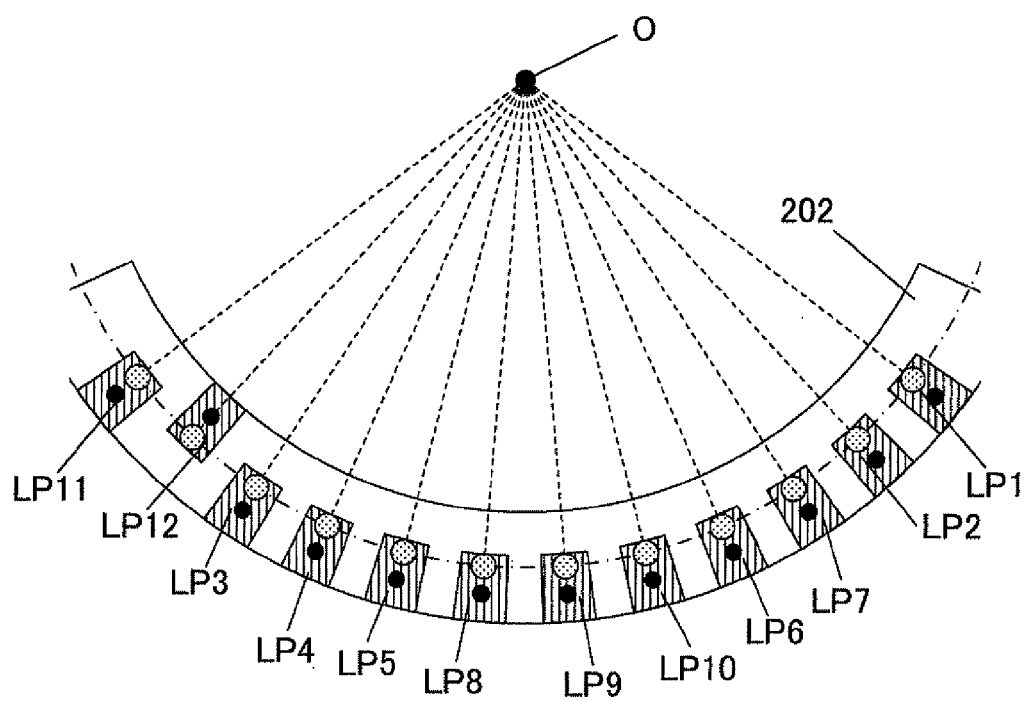
FIG. 16 is a front view of a holding portion, presenting an example of a positional arrangement with which the lens connector terminals may be disposed.

For instance, the exposed area of a single lens connector terminal (the twelfth lens connector terminal LP12) alone among the twelve lens connector terminals, may be disposed further toward the inner circumferential side of the holding portion 202 (the side closer to the mount center point O), with the exposed areas of the remaining eleven lens connector terminals LP1 through LP11 disposed further toward the outer circumferential side of the holding portion 202 (the side further away from the mount center point O), as shown in FIG. 16. Furthermore, the exposed area of a lens connector terminal other than the twelfth lens connector terminal LP12 may be disposed further toward the inner circumferential side of the holding portion 202, or the exposed areas of more than one lens connector terminal may be disposed further toward the inner circumferential side of the holding portion 202. In addition, the exposed areas at the twelve lens connector terminals LP1 through LP12 may assume matching sizes or one or more lens connector terminals may include exposed areas, the size of which are different from the size of the exposed areas at the remaining lens connector terminals.

(Variation 2)

The embodiments have been described by assuming that the position data indicating the position of the focusing lens 210b are transmitted from the exchangeable lens 200 to the camera body 100 through hotline communication. However, the present invention is not limited to this example and may be adopted in a system configured so as to transmit condition information pertaining to a drive target member other than the focusing lens through hotline communication. For instance, the present invention may be adopted in conjunction with an exchangeable lens 200 equipped with a blur correction lens, via which image blur attributable to unsteady handling during photographing operation is corrected. In such a case, position data indicating the position of the blur correction lens (X,Y position) may be transmitted through hotline communication. Furthermore, the present invention may be adopted in a system in which position information indicating the position of the aperture included in the exchangeable lens (information related to the size of the aperture opening) is transmitted. Moreover, in conjunction with an exchangeable lens 200 that includes a zoom lens, information related to the focal length of the lens may be transmitted through hotline communication. Under such circumstances, the generation processing 501 in FIG. 7B will include processing for generating blur correction lens position data, processing for generating aperture control position data pertaining to the aperture used to form the aperture opening (position information corresponding to the opening size), or processing for generating zoom lens position data.

(Variation 3)

The holding portion 102 (on the body side) and the holding portion 202 (on the lens side) are each manufactured as an integrated component (single component) in the embodiments described earlier. However, the present invention is not limited to this example and it may be adopted in conjunction with holding portions 102 and 202 each constituted with a plurality of separate holding portion parts, with one part corresponding to a specific number of terminals, which are put together as a single assembly.

(Variation 4)

While the camera system described in reference to the embodiments includes separate communication interfaces in correspondence to two different types of communication, (hotline communication and command data communication), the present invention may be adopted in conjunction with an integrated communication interface. Namely, the first lens-side communication unit 217 and the second lens-side communication unit 218 on the exchangeable lens side may be integrated into a single communication unit. Likewise, the first body-side communication unit 117 and the second body-side communication unit 118 on the camera body side may be integrated into a single communication unit. Furthermore, a body control unit and a lens control unit with built-in functions enabling them to fulfill the functions of the corresponding communication interfaces, instead of the body control unit 103 and the lens control unit 203, may be utilized.

(Variation 5)

The present invention is adopted in a camera system comprising the camera body 100 and the exchangeable lens 200 in the embodiments described earlier. However, the present invention is not limited to this example and the structure described in reference to the embodiments (the camera body-side structure) may be adopted in any electronic device that includes a mount at which the exchangeable lens 200 can be attached, is capable of communicating with the exchangeable lens 200 and is also capable of providing power to the exchangeable lens. Such an electronic device may be, for instance, a projector. A projector system similar to the camera system described in reference to the embodiments can be achieved by configuring the projection lens of the projector as a detachable/exchangeable projection lens.

(Variation 6)

As has been described, the camera system achieved in the embodiments may include a blur correction mechanism equipped with a blur correction lens movable along a direction with directional components perpendicular to the optical axis of the image forming optical system 210, via which image blur due to unsteady hand movement is corrected by driving the blur correction lens. However, the present invention is not limited to this example and may be adopted in conjunction with a blur correction mechanism that corrects image blur by swinging (oscillating) a blur correction optical system within a plane that contains the optical axis of the image forming optical system 210.

As long as the features characterizing the present invention are not compromised, the present invention is not limited to the particulars of the embodiments described above and other modes that are conceivable within the technical scope of the present invention are also within the scope of the invention.

What is claimed is:

1. An exchangeable lens, comprising:
a camera lens mount unit having a mount center point, to which a camera body, with twelve body connector terminals disposed near a camera body mount unit at the camera body, is attached;
a holding portion where twelve lens connector terminals, each connected to one of the twelve body connector terminals and each including a contact area to come into contact with one of the body connector terminals, are disposed;
an optical system that includes a drive target member which can be driven; and
a drive unit that drives the drive target member, wherein:
the twelve lens connector terminals are:
a first lens connector terminal through which a drive voltage to be used to engage the drive unit in operation is provided from the camera body;
a second lens connector terminal that functions as a ground terminal corresponding to the drive voltage;
a third lens connector terminal through which a first clock signal from the camera body is input;
a fourth lens connector terminal through which a first data signal from the camera body is input in synchronization with the first clock signal;
a fifth lens connector terminal through which a second data signal is output to the camera body in synchronization with the first clock signal;
a sixth lens connector terminal through which a second clock signal from the camera body is input;
a seventh lens connector terminal through which a third data signal is output to the camera body in synchronization with the second clock signal;
an eighth lens connector terminal through which a first asynchronous signal that is not synchronous with the first clock signal or the second clock signal is output to the camera body;
a ninth lens connector terminal through which a second asynchronous signal that is not synchronous with the first clock signal or the second clock signal is input from the camera body;
a tenth lens connector terminal through which a third asynchronous signal that is not synchronous with the first clock signal or the second clock signal is output to the camera body;
an eleventh lens connector terminal through which an operating voltage, enabling reception of the first data signal from the camera body through the fourth lens connector terminal and transmission of the second data signal to the camera body through the fifth lens connector terminal based upon the first asynchronous signal output through the eighth lens connector terminal and the first clock signal input through the third lens connector terminal and also enabling transmission of the third data signal to the camera body through the seventh lens connector terminal based upon the second asynchronous signal input through the ninth lens connector terminal, the third asynchronous signal output through the tenth lens connector terminal and the second clock signal input through the sixth lens connector terminal, is provided from the camera body; and
a twelfth lens connector terminal that functions as a ground terminal corresponding to the operating voltage;
an interior angle formed by the contact area of the first lens connector terminal and the contact area of the eleventh lens connector terminal at the mount center point is largest among interior angles, each formed by contact areas of any two lens connector terminals among the twelve lens connector terminals at the mount center point;
an interior angle formed by the contact area of the eleventh lens connector terminal and the contact area of the twelfth lens connector terminal at the mount center point is smaller than an interior angle formed by the contact area of any lens connector terminal among the first lens connector terminal through the tenth lens connector terminal and the contact area of the eleventh lens connector terminal at the mount center point;
an interior angle formed by the contact area of the third lens connector terminal and the contact area of the eleventh lens connector terminal at the mount center point is smaller than an interior angle formed by the contact area of any lens connector terminal among the first lens connector terminal, the second lens connector terminal and the fourth lens connector terminal through the tenth lens connector terminal and the contact area of the eleventh lens connector terminal at the mount center point;
an interior angle formed by the contact area of the fourth lens connector terminal and the contact area of the eleventh lens connector terminal at the mount center point is smaller than an interior angle fowled by the contact area of any lens connector terminal among the first lens connector terminal, the second lens connector terminal and the fifth lens connector terminal through the tenth lens connector terminal and the contact area of the eleventh lens connector terminal at the mount center point;
an interior angle formed by the contact area of the fifth lens connector terminal and the contact area of the eleventh lens connector terminal at the mount center point is smaller than an interior angle formed by the contact area of any lens connector terminal among the first lens connector terminal, the second lens connector terminal and the sixth lens connector terminal through the tenth lens connector terminal and the contact area of the eleventh lens connector terminal at the mount center point;
an interior angle formed by the contact area of the eighth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal, the ninth lens connector terminal and the tenth lens connector terminal and the contact area of the eleventh lens connector terminal at the mount center point;
an interior angle formed by the contact area of the ninth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal and the tenth lens connector terminal and the contact area of the eleventh lens connector terminal at the mount center point;
an interior angle formed by the contact area of the tenth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal and the seventh lens connector terminal and the contact area of the eleventh lens connector terminal at the mount center point;
an interior angle formed by the contact area of the sixth lens connector terminal and the contact area of the eleventh lens connector terminal at the mount center point is smaller than an interior angle formed by the contact area of any lens connector terminal among the first lens connector terminal, the second lens connector terminal and the seventh lens connector terminal and the contact area of the eleventh lens connector terminal at the mount center point;
an interior angle formed by the contact area of the seventh lens connector terminal and the contact area of the eleventh lens connector terminal at the mount center point is smaller than an interior angle formed by the contact area of either the first lens connector terminal or the second lens connector terminal and the contact area of the eleventh lens connector terminal at the mount center point;
an interior angle formed by the contact area of the second lens connector terminal and the contact area of the eleventh lens connector terminal at the mount center point is smaller than an interior angle formed by the contact area of the first lens connector terminal and the contact area of the eleventh lens connector terminal at the mount center point; and
a distance setting apart a center of at least one lens connector terminal among the twelve lens connector terminals from the mount center point is different from a distance setting apart a center of at least one other lens connector terminal from the mount center point.

2. An exchangeable lens according to claim 1, wherein:
the twelve lens connector terminals are disposed in the holding portion in a staggered pattern so as to achieve varying distances between centers of the lens connector terminals and the mount center point.

3. An exchangeable lens according to claim 1, wherein:
a distance setting apart the center of at least one lens connector terminal among the first lens connector terminal, the second lens connector terminal, the eleventh lens connector terminal and the twelfth lens connector terminal from the mount center point is different from a distance setting apart the center of at least one lens connector terminal among the third lens connector terminal through the tenth lens connector terminal from the mount center point.

4. An exchangeable lens according to claim 1, wherein:
a distance setting apart the center of at least one lens connector terminal among the third lens connector terminal, the fourth lens connector terminal, the fifth lens connector terminal and the eighth lens connector terminal from the mount center point is different from a distance setting apart the center of at least one lens connector terminal among the sixth lens connector terminal, the seventh lens connector terminal, the ninth lens connector terminal and the tenth lens connector terminal from the mount center point.

5. An exchangeable lens according to claim 1, wherein:
a distance setting apart the center of at least one lens connector terminal among the third lens connector terminal, the fourth lens connector terminal, the sixth lens connector terminal and the ninth lens connector terminal from the mount center point is different from a distance setting apart the center of at least one lens connector terminal among the fifth lens connector terminal, the seventh lens connector terminal, the eighth lens connector terminal and the tenth lens connector terminal from the mount center point.

6. An exchangeable lens according to claim 1, wherein:
a distance setting apart the center of at least one lens connector terminal among the third lens connector terminal, the fourth lens connector terminal, the fifth lens connector terminal, the sixth lens connector terminal and the seventh lens connector terminal from the mount center point is different from a distance setting apart the center of at least one lens connector terminal among the eighth lens connector terminal, the ninth lens connector terminal and the tenth lens connector terminal from the mount center point.

7. An exchangeable lens according to claim 1, wherein:
the contact area of at least one lens connector terminal among the twelve lens connector terminals includes a sloping part at which the lens connector terminal comes into contact with a body connector terminal.

8. An exchangeable lens, comprising:
a camera lens mount unit having a mount center point, to which a camera body, with twelve body connector terminals disposed near a camera body mount unit at the camera body, is attached;
a holding portion where twelve lens connector terminals, each connected to one of the twelve body connector terminals and each including a contact area to come into contact with one of the body connector terminals, are disposed;
an optical system that includes a drive target member which can be driven; and
a drive unit that drives the drive target member, wherein:
the twelve lens connector terminals are:
  a first lens connector terminal through which an drive voltage to be used to engage the drive unit in operation is provided from the camera body;
  a second lens connector terminal that functions as a ground terminal corresponding to the drive voltage;
  a third lens connector terminal through which a first clock signal from the camera body is input;
  a fourth lens connector terminal through which a first data signal from the camera body is input in synchronization with the first clock signal;
  a fifth lens connector terminal through which a second data signal is output to the camera body in synchronization with the first clock signal;
  a sixth lens connector terminal through which a second clock signal from the camera body is input;
  a seventh lens connector terminal through which a third data signal is output to the camera body in synchronization with the second clock signal;
  an eighth lens connector terminal through which a first asynchronous signal that is not synchronous with the first clock signal or the second clock signal is output to the camera body;
  a ninth lens connector terminal through which a second asynchronous signal that is not synchronous with the first clock signal or the second clock signal is input from the camera body;
  a tenth lens connector terminal through which a third asynchronous signal that is not synchronous with the first clock signal or the second clock signal is output to the camera body;
  an eleventh lens connector terminal through which an operating voltage, enabling reception of the first data signal from the camera body through the fourth lens connector terminal and transmission of the second data signal to the camera body through the fifth lens connector terminal based upon the first asynchronous signal output through the eighth lens connector terminal and the first clock signal input through the third lens connector terminal and also enabling transmission of the third data signal to the camera body through the seventh lens connector terminal based upon the second asynchronous signal input through the ninth lens connector terminal, the third asynchronous signal output through the tenth lens connector terminal and the second clock signal input through the sixth lens connector terminal, is provided from the camera body; and
  a twelfth lens connector terminal that functions as a ground terminal corresponding to the operating voltage;
an interior angle formed by the contact area of the first lens connector terminal and the contact area of the eleventh lens connector terminal at the mount center point is largest among interior angles, each formed by contact areas of any two lens connector terminals among the twelve lens connector terminals at the mount center point;
an interior angle formed by the contact area of the eleventh lens connector terminal and the contact area of the twelfth lens connector terminal at the mount center point is smaller than an interior angle formed by the contact area of any lens connector terminal among the first lens connector terminal through the tenth lens connector terminal and the contact area of the eleventh lens connector terminal at the mount center point;
an interior angle formed by the contact area of the third lens connector terminal and the contact area of the eleventh lens connector terminal at the mount center point is smaller than an interior angle formed by the contact area of any lens connector terminal among the first lens connector terminal, the second lens connector terminal and the fourth lens connector terminal through the tenth lens connector terminal and the contact area of the eleventh lens connector terminal at the mount center point;
an interior angle formed by the contact area of the fourth lens connector terminal and the contact area of the eleventh lens connector terminal at the mount center point is smaller than an interior angle formed by the contact area of any lens connector terminal among the first lens connector terminal, the second lens connector terminal and the fifth lens connector terminal through the tenth lens connector terminal and the contact area of the eleventh lens connector terminal at the mount center point;
an interior angle formed by the contact area of the fifth lens connector terminal and the contact area of the eleventh lens connector terminal at the mount center point is smaller than an interior angle formed by the contact area of any lens connector terminal among the first lens connector terminal, the second lens connector terminal and the sixth lens connector terminal through the tenth lens connector terminal and the contact area of the eleventh lens connector terminal at the mount center point;

an interior angle formed by the contact area of the eighth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal, the ninth lens connector terminal and the tenth lens connector terminal and the contact area of the eleventh lens connector terminal at the mount center point;

an interior angle formed by the contact area of the ninth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal and the tenth lens connector terminal and the contact area of the eleventh lens connector terminal at the mount center point;

an interior angle formed by the contact area of the tenth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal and the seventh lens connector terminal and the contact area of the eleventh lens connector terminal at the mount center point;

an interior angle formed by the contact area of the sixth lens connector terminal and the contact area of the eleventh lens connector terminal at the mount center point is smaller than an interior angle formed by the contact area of any lens connector terminal among the first lens connector terminal, the second lens connector terminal and the seventh lens connector terminal and the contact area of the eleventh lens connector terminal at the mount center point;

an interior angle formed by the contact area of the seventh lens connector terminal and the contact area of the eleventh lens connector terminal at the mount center point is smaller than an interior angle formed by the contact area of either the first lens connector terminal or the second lens connector terminal and the contact area of the eleventh lens connector terminal at the mount center point;

an interior angle formed by the contact area of the second lens connector terminal and the contact area of the eleventh lens connector terminal at the mount center point is smaller than an interior angle formed by the contact area of the first lens connector terminal and the contact area of the eleventh lens connector terminal at the mount center point; and the twelve lens connector terminals are disposed in the holding portion in a staggered pattern.

9. An exchangeable lens, comprising:

a camera lens mount unit having a mount center point, to which a camera body, with twelve body connector terminals disposed near a camera body mount unit at the camera body, is attached;

a holding portion where at least five lens connector terminals, each including a contact area to come into contact with one of the body connector terminals, are disposed;

an optical system that includes a drive target member which can be driven; and a drive unit that drives the drive target member, wherein:

the five lens connector terminals are:

a clock input lens connector terminal through which a clock signal from the camera body is input;

a data input lens connector terminal through which a first data signal from the camera body is input in synchronization with the clock signal;

a data output lens connector terminal through which a second data signal is output to the camera body in synchronization with the clock signal;

an asynchronous signal output lens connector terminal through which an asynchronous signal that is not synchronous with the clock signal is output to the camera body; and a voltage supply lens connector terminal through which an operating voltage, enabling reception of the first data signal from the camera body through the data input lens connector terminal and transmission of the second data signal to the camera body through the data output lens connector terminal based upon the asynchronous signal output through the asynchronous signal output lens connector terminal and the clock signal input through the clock input lens connector terminal, is provided from the camera body;

an interior angle formed by the contact area of the asynchronous signal output lens connector terminal and the contact area of the voltage supply lens connector terminal at the mount center point is largest among interior angles, each formed by contact areas of any two lens connector terminals among the five lens connector terminals at the mount center point;

an interior angle formed by the contact area of the clock input lens connector terminal and the contact area of the voltage supply lens connector terminal at the mount center point is smaller than an interior angle formed by the contact area of any lens connector terminal among the data input lens connector terminal, the data output lens connector terminal and the asynchronous signal output lens connector terminal and the contact area of the voltage supply lens connector terminal at the mount center point;

an interior angle formed by the contact area of the data input lens connector terminal and the contact area of the voltage supply lens connector terminal at the mount center point is smaller than an interior angle formed by the contact area of either the data output lens connector terminal or the asynchronous signal output lens connector terminal and the contact area of the voltage supply lens connector terminal at the mount center point;

an interior angle formed by the contact area of the data output lens connector terminal and the contact area of the voltage supply lens connector terminal is smaller than an interior angle formed by the contact area of the asynchronous signal output lens connector terminal and the contact area of the voltage supply lens connector terminal; and a distance setting apart a center of at least one lens connector terminal among the five lens connector terminals from the mount center point is different from a distance setting apart the center of at least one other lens connector terminal from the mount center point.

10. An exchangeable lens, comprising:

a camera lens mount unit having a mount center point, to which a camera body, with twelve body connector terminals disposed near a camera body mount unit at the camera body, is attached;

a holding portion where twelve lens connector terminals, each connected to one of the twelve body connector terminals and each including a contact area to come into contact with one of the body connector terminals, are disposed;

an optical system that includes a drive target member which can be driven; and a drive unit that drives the drive target member, wherein:

the twelve lens connector terminals, each including an exposed area exposed at a surface of the holding portion are:

a first lens connector terminal through which an drive voltage to be used to engage the drive unit in operation is provided from the camera body;

a second lens connector terminal that functions as a ground terminal corresponding to the drive voltage;

a third lens connector terminal through which a first clock signal from the camera body is input;

a fourth lens connector terminal through which a first data signal from the camera body is input in synchronization with the first clock signal;

a fifth lens connector terminal through which a second data signal is output to the camera body in synchronization with the first clock signal;

a sixth lens connector terminal through which a second clock signal from the camera body is input;

a seventh lens connector terminal through which a third data signal is output to the camera body in synchronization with the second clock signal;

an eighth lens connector terminal through which a first asynchronous signal that is not synchronous with the first clock signal or the second clock signal is output to the camera body;

a ninth lens connector terminal through which a second asynchronous signal that is not synchronous with the first clock signal or the second clock signal is input from the camera body;

a tenth lens connector terminal through which a third asynchronous signal that is not synchronous with the first clock signal or the second clock signal is output to the camera body;

an eleventh lens connector terminal through which an operating voltage, enabling reception of the first data signal from the camera body through the fourth lens connector terminal and transmission of the second data signal to the camera body through the fifth lens connector terminal based upon the first asynchronous signal output through the eighth lens connector terminal and the first clock signal input through the third lens connector terminal and also enabling transmission of the third data signal to the camera body through the seventh lens connector terminal based upon the second asynchronous signal input through the ninth lens connector terminal, the third asynchronous signal output through the tenth lens connector terminal and the second clock signal input through the sixth lens connector terminal, is provided from the camera body; and a twelfth lens connector terminal that functions as a ground terminal corresponding to the operating voltage;

an interior angle formed by the contact area of the first lens connector terminal and the contact area of the eleventh lens connector terminal at the mount center point is largest among interior angles, each formed by contact areas of any two lens connector terminals among the twelve lens connector terminals at the mount center point;

an interior angle formed by the contact area of the eleventh lens connector terminal and the contact area of the twelfth lens connector terminal at the mount center point is smaller than an interior angle formed by the contact area of any lens connector terminal among the first lens connector terminal through the tenth lens connector terminal and the contact area of the eleventh lens connector terminal at the mount center point;

an interior angle formed by the contact area of the third lens connector terminal and the contact area of the eleventh lens connector terminal at the mount center point is smaller than an interior angle formed by the contact area of any lens connector terminal among the first lens connector terminal, the second lens connector terminal and the fourth lens connector terminal through the tenth lens connector terminal and the contact area of the eleventh lens connector terminal at the mount center point;

an interior angle formed by the contact area of the fourth lens connector terminal and the contact area of the eleventh lens connector terminal at the mount center point is smaller than an interior angle formed by the contact area of any lens connector terminal among the first lens connector terminal, the second lens connector terminal and the fifth lens connector terminal through the tenth lens connector terminal and the contact area of the eleventh lens connector terminal at the mount center point;

an interior angle formed by the contact area of the fifth lens connector terminal and the contact area of the eleventh lens connector terminal at the mount center point is smaller than an interior angle formed by the contact area of any lens connector terminal among the first lens connector terminal, the second lens connector terminal and the sixth lens connector terminal through the tenth lens connector terminal and the contact area of the eleventh lens connector terminal at the mount center point;

an interior angle formed by the contact area of the eighth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal, the ninth lens connector terminal and the tenth lens connector terminal and the contact area of the eleventh lens connector terminal at the mount center point;

an interior angle formed by the contact area of the ninth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal and the tenth lens connector terminal and the contact area of the eleventh lens connector terminal at the mount center point;

an interior angle formed by the contact area of the tenth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal and the seventh lens connector terminal and the contact area of the eleventh lens connector terminal at the mount center point;

an interior angle formed by the contact area of the sixth lens connector terminal and the contact area of the eleventh lens connector terminal at the mount center point is smaller than an interior angle formed by the contact area of any lens connector terminal among the first lens connector terminal, the second lens connector terminal and the seventh lens connector terminal and the contact area of the eleventh lens connector terminal at the mount center point;

an interior angle formed by the contact area of the seventh lens connector terminal and the contact area of the eleventh lens connector terminal at the mount center point is smaller than an interior angle formed by the contact area of either the first lens connector terminal or the second lens connector terminal and the contact area of the eleventh lens connector terminal at the mount center point;

an interior angle formed by the contact area of the second lens connector terminal and the contact area of the eleventh lens connector terminal at the mount center point is smaller than an interior angle formed by the contact area of the first lens connector terminal and the contact area of the eleventh lens connector terminal at the mount center point; and a distance setting apart the center of the exposed area of at least one lens connector terminal among the twelve lens connector terminals from the mount center point is different from a distance setting apart the center of the exposed area of at least one other lens connector terminal from the mount center point.

11. An exchangeable lens according to claim 10, wherein:
the twelve lens connector terminals are disposed in the holding portion in a staggered pattern so as to achieve varying distances between centers of exposed areas of the lens connector terminals and the mount center point.

12. An exchangeable lens according to claim 10, wherein:
a distance setting apart the center of the exposed area of at least one lens connector terminal among the first lens connector terminal, the second lens connector terminal, the eleventh lens connector terminal and the twelfth lens connector terminal from the mount center point is different from a distance setting apart the center of the exposed area of at least one lens connector terminal among the third lens connector terminal through the tenth lens connector terminal from the mount center point.

13. An exchangeable lens according to claim 10, wherein:
a distance setting apart the center of the exposed area of at least one lens connector terminal among the third lens connector terminal, the fourth lens connector terminal, the fifth lens connector terminal and the eighth lens connector terminal from the mount center point is different from a distance setting apart the center of the exposed area of at least one lens connector terminal among the sixth lens connector terminal, the seventh lens connector terminal, the ninth lens connector terminal and the tenth lens connector terminal from the mount center point.

14. An exchangeable lens according to claim 10, wherein:
a distance setting apart the center of the exposed area of at least one lens connector terminal among the third lens connector terminal, the fourth lens connector terminal, the sixth lens connector terminal and the ninth lens connector terminal from the mount center point is different from a distance setting apart the center of the exposed area of at least one lens connector terminal among the fifth lens connector terminal, the seventh lens connector terminal, the eighth lens connector terminal and the tenth lens connector terminal from the mount center point.

15. An exchangeable lens according to claim 10, wherein:
a distance setting apart the center of the exposed area of at least one lens connector terminal among the third lens connector terminal, the fourth lens connector terminal, the fifth lens connector terminal, the sixth lens connector terminal and the seventh lens connector terminal from the mount center point is different from a distance setting apart the center of the exposed area of at least one lens connector terminal among the eighth lens connector terminal, the ninth lens connector terminal and the tenth lens connector terminal from the mount center point.

16. An exchangeable lens according to claim 10, wherein:
the contact area of at least one lens connector terminal among the twelve lens connector terminals includes a sloping part at which the lens connector terminal comes into contact with a body connector terminal.

17. An exchangeable lens, comprising:
a camera lens mount unit having a mount center point, to which a camera body, with twelve body connector terminals disposed near a camera body mount unit at the camera body, is attached;

a holding portion where twelve lens connector terminals, each connected to one of the twelve body connector terminals and each including a contact area to come into contact with one of the body connector terminals, are disposed;

an optical system that includes a drive target member which can be driven; and a drive unit that drives the drive target member, wherein:
the twelve lens connector terminals, each including an exposed area at a surface of the holding portion, are:
  a first lens connector terminal through which a drive voltage to be used to engage the drive unit in operation is provided from the camera body;
  a second lens connector terminal that functions as a ground terminal corresponding to the drive voltage;
  a third lens connector terminal through which a first clock signal from the camera body is input;
  a fourth lens connector terminal through which a first data signal from the camera body is input in synchronization with the first clock signal;
  a fifth lens connector terminal through which a second data signal is output to the camera body in synchronization with the first clock signal;
  a sixth lens connector terminal through which a second clock signal from the camera body is input;
  a seventh lens connector terminal through which a third data signal is output to the camera body in synchronization with the second clock signal;
  an eighth lens connector terminal through which a first asynchronous signal that is not synchronous with the first clock signal or the second clock signal is output to the camera body;
  a ninth lens connector terminal through which a second asynchronous signal that is not synchronous with the first clock signal or the second clock signal is input from the camera body;
  a tenth lens connector terminal through which a third asynchronous signal that is not synchronous with the first clock signal or the second clock signal is output to the camera body;
  an eleventh lens connector terminal through which an operating voltage, enabling reception of the first data signal from the camera body through the fourth lens connector terminal and transmission of the second data signal to the camera body through the fifth lens connector terminal based upon the first asynchronous signal output through the eighth lens connector terminal and the first clock signal input through the third lens connector terminal and also enabling transmission of the third data signal to the camera body through the seventh lens connector terminal based upon the second asynchronous signal input through the ninth lens connector terminal, the third asynchronous signal output through the tenth lens connector terminal and the second clock signal input through the sixth lens connector terminal, is provided from the camera body; and a twelfth lens connector terminal that functions as a ground terminal corresponding to the operating voltage;

an interior angle formed by the contact area of the first lens connector terminal and the contact area of the eleventh lens connector terminal at the mount center point is largest among interior angles, each formed by contact areas of any two lens connector terminals among the twelve lens connector terminals at the mount center point;

an interior angle formed by the contact area of the eleventh lens connector terminal and the contact area of the twelfth lens connector terminal at the mount center point is smaller than an interior angle formed by the contact area of any lens connector terminal among the first lens connector terminal through the tenth lens connector terminal and the contact area of the eleventh lens connector terminal at the mount center point;

an interior angle formed by the contact area of the third lens connector terminal and the contact area of the eleventh lens connector terminal at the mount center point is smaller than an interior angle formed by the contact area of any lens connector terminal among the first lens connector terminal, the second lens connector terminal and the fourth lens connector terminal through the tenth lens connector terminal and the contact area of the eleventh lens connector terminal at the mount center point;

an interior angle formed by the contact area of the fourth lens connector terminal and the contact area of the eleventh lens connector terminal at the mount center point is smaller than an interior angle formed by the contact area of any lens connector terminal among the first lens connector terminal, the second lens connector terminal and the fifth lens connector terminal through the tenth lens connector terminal and the contact area of the eleventh lens connector terminal at the mount center point;

an interior angle formed by the contact area of the fifth lens connector terminal and the contact area of the eleventh lens connector terminal at the mount center point is smaller than an interior angle formed by the contact area of any lens connector terminal among the first lens connector terminal, the second lens connector terminal and the sixth lens connector terminal through the tenth lens connector terminal and the contact area of the eleventh lens connector terminal at the mount center point;

an interior angle formed by the contact area of the eighth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal, the ninth lens connector terminal and the tenth lens connector terminal and the contact area of the eleventh lens connector terminal at the mount center point;

an interior angle formed by the contact area of the ninth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal, the seventh lens connector terminal and the tenth lens connector terminal and the contact area of the eleventh lens connector terminal at the mount center point;

an interior angle formed by the contact area of the tenth lens connector terminal and the contact area of the eleventh lens connector terminal at the mount center point is smaller than an interior angle formed by the contact area of any lens connector terminal among the first lens connector terminal, the second lens connector terminal, the sixth lens connector terminal and the seventh lens connector terminal and the contact area of the eleventh lens connector terminal at the mount center point;

an interior angle formed by the contact area of the sixth lens connector terminal and the contact area of the eleventh lens connector terminal at the mount center point is smaller than an interior angle formed by the contact area of any lens connector terminal among the first lens connector terminal, the second lens connector terminal and the seventh lens connector terminal and the contact area of the eleventh lens connector terminal at the mount center point;

an interior angle formed by the contact area of the seventh lens connector terminal and the contact area of the eleventh lens connector terminal at the mount center point is smaller than an interior angle formed by the contact area of either the first lens connector terminal or the second lens connector terminal and the contact area of the eleventh lens connector terminal at the mount center point;

an interior angle formed by the contact area of the second lens connector terminal and the contact area of the eleventh lens connector terminal at the mount center point is smaller than an interior angle formed by the contact area of the first lens connector terminal and the contact area of the eleventh lens connector terminal at the mount center point; and centers of the exposed areas of the twelve lens connector terminals are disposed in the holding portion in a staggered pattern.

18. An exchangeable lens, comprising:

a camera lens mount unit having a mount center point, to which a camera body, with twelve body connector terminals disposed near a camera body mount unit at the camera body, is attached;

a holding portion where at least five lens connector terminals, each including a contact area to come into contact with one of the body connector terminals, are disposed;

an optical system that includes a drive target member which can be driven; and a drive unit that drives the drive target member, wherein:

the five lens connector terminals, each including an exposed area at a surface of the holding portion, are:

a clock input lens connector terminal through which a clock signal from the camera body is input;

a data input lens connector terminal through which a first data signal from the camera body is input in synchronization with the clock signal;

a data output lens connector terminal through which a second data signal is output to the camera body in synchronization with the clock signal;

an asynchronous signal output lens connector terminal through which an asynchronous signal that is not synchronous with the clock signal is output to the camera body; and a voltage supply lens connector terminal through which an operating voltage, enabling reception of the first data signal from the camera body through the data input lens connector terminal and transmission of the second data signal to the camera body through the data output lens connector terminal based upon the asynchronous signal output through the asynchronous signal output lens connector terminal and the clock signal input through the clock input lens connector terminal, is provided from the camera body;

an interior angle formed by the contact area of the asynchronous signal output lens connector terminal and the contact area of the voltage supply lens connector terminal at the mount center point is largest among interior angles, each formed by contact areas of any two lens connector terminals among the five lens connector terminals at the mount center point;

an interior angle formed by the contact area of the clock input lens connector terminal and the contact area of the voltage supply lens connector terminal at the mount center point is smaller than an interior angle formed by the contact area of any lens connector terminal among the data input lens connector terminal, the data output lens connector terminal and the asynchronous signal output lens connector terminal and the contact area of the voltage supply lens connector terminal at the mount center point;

an interior angle formed by the contact area of the data input lens connector terminal and the contact area of the voltage supply lens connector terminal at the mount center point is smaller than an interior angle formed by the contact area of either the data output lens connector terminal or the asynchronous signal output lens connector terminal and the contact area of the voltage supply lens connector terminal at the mount center point;

an interior angle formed by the contact area of the data output lens connector terminal and the contact area of the voltage supply lens connector terminal at the mount center point is smaller than an interior angle formed by the contact area of the asynchronous signal output lens connector terminal and the contact area of the voltage supply lens connector terminal at the mount center point; and a distance setting apart a center of the exposed area of at least one lens connector terminal among the five lens connector terminals from the mount center point is different from a distance setting apart a center of the exposed area of at least one other lens connector terminal from the mount center point.

19. An exchangeable lens according to claim 10, wherein:

the holding portion includes a recess formed at the surface thereof, the twelve lens connector terminals each include a fixing part continuous to the exposed area; and the fixing part is fixed at the recess.

* * * * *